(12) United States Patent
Takahashi

(10) Patent No.: US 8,710,151 B2
(45) Date of Patent: Apr. 29, 2014

(54) ONIUM SALT-CONTAINING POLYMER

(75) Inventor: Eiji Takahashi, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 188 days.

(21) Appl. No.: 12/809,377

(22) PCT Filed: Dec. 25, 2008

(86) PCT No.: PCT/JP2008/003981
§ 371 (c)(1),
(2), (4) Date: Jun. 18, 2010

(87) PCT Pub. No.: WO2009/081591
PCT Pub. Date: Jul. 2, 2009

(65) Prior Publication Data
US 2011/0201759 A1 Aug. 18, 2011

(30) Foreign Application Priority Data

Dec. 25, 2007 (JP) ................................. 2007-333064
Jan. 31, 2008 (JP) ................................. 2008-021780

(51) Int. Cl.
*C08F 259/08* (2006.01)
*C08F 275/00* (2006.01)
*C08F 297/02* (2006.01)

(52) U.S. Cl.
CPC ............. *C08F 275/00* (2013.01); *C08F 259/08* (2013.01); *C08F 297/02* (2013.01)
USPC ........... 525/288; 525/276; 525/287; 525/291; 525/294

(58) Field of Classification Search
CPC ..... C08F 259/08; C08F 275/00; C08F 297/00
USPC .......................... 525/276, 287, 288, 291, 294
See application file for complete search history.

(56) References Cited

U.S. PATENT DOCUMENTS

| 4,433,113 A | 2/1984 | Woodward et al. | |
| 5,130,221 A * | 7/1992 | El-Sayed et al. | 430/114 |
| 6,562,428 B1 | 5/2003 | Ohrui | |
| 2005/0159556 A1 * | 7/2005 | Lewis et al. | 525/280 |
| 2005/0288446 A1 | 12/2005 | Zieske et al. | |

FOREIGN PATENT DOCUMENTS

| EP | 0 344 692 A2 | 12/1989 | |
| EP | 0 474 896 A1 | 3/1992 | |
| JP | 07234514 A * | 9/1995 | ............... G03F 7/11 |
| JP | A-7-278400 | 10/1995 | |
| JP | A-10-195422 | 7/1998 | |
| JP | A-10-310618 | 11/1998 | |
| JP | A-11-221971 | 8/1999 | |
| JP | A-2003-226866 | 8/2003 | |
| JP | A-2006-2050 | 1/2006 | |
| JP | A-2006-104458 | 4/2006 | |
| JP | A-2007-23060 | 2/2007 | |
| WO | WO 2007102984 A1 * | 9/2007 | |

OTHER PUBLICATIONS

Laschewsky Current Opinion in Colloid and Interface Science 2003, 8, 274-281.*
Lowe et al. Macromolecules 1999, 32, 2141-2148.*
Sawada et al. European Polymer Journal 2001, 37, 1433-1439.*
Machine translation of JP 07234514 A (2013).*
International Search Report issued in International Application No. PCT/JP2008/003981 on Mar. 17, 2009.
International Preliminary Report on Patentability issued in Patent Application No. PCT/JP2008/003981, dated Jul. 20, 2010 (with translation).
European Search Report issued in Application No. 08864376.2; Dated Mar. 11, 2011.
Jan. 31, 2012 European Office Action issued in European Application No. 08 864 376.2.

* cited by examiner

*Primary Examiner* — Mark Kaucher
(74) *Attorney, Agent, or Firm* — Oliff PLC

(57) ABSTRACT

It is to provide a polymer having a high antistatic function, a high solubility to solvent and high compatibility to a formulation, and an antistatic agent, curable composition or a water repellent and oil repellent comprising the polymer. It is a linear block polymer, block star polymer or block graft polymer in which at least one block is a block wherein an anion and a counter cation form an onium salt on the polymer chain side, and a composition comprising the same. It is preferred that a linear block polymer has a number average molecular weight of 20000 or less, and a block star polymer and block graft polymer has a number average molecular weight of 10000 or more.

9 Claims, No Drawings

ONIUM SALT-CONTAINING POLYMER

TECHNICAL FIELD

The present invention relates to a polymer containing onium salt in at least one block, having superior electrical conductivity, and which is suitably used in antistatic agents, etc.

BACKGROUND ART

Recently, needs of antistatic agents are increasing not only for displays or optical materials but in a wide range of areas including food-related areas. Surfactants or metal oxides are known as antistatic agents, but it is believed that a polymer-type antistatic agent which has excellent transparency and can be expected to have permanent stability is preferred when taking into account a wide application range. Further, as for needs of antistaticity in a composition, awaited is an antistatic agent that functions effectively with a small addition amount which do not impair the composition properties.

As polymer-type antistatic agents, those comprising polyethylene oxide, or those having an ammonium salt structure, or an alkali metal salt structure of acid are known (Patent Documents 1 and 2).

However, for those comprising polyethylene oxide, a high antistatic effect cannot be expected, and it is sometimes necessary to add lithium salt, etc. to improve the effect. Further, polymers comprising ammonium have a limited mobility, and the antistatic property has a tendency to be lower as compared to those in which ammonium is present as a counter cation. The surface resistance level of the film surface using those polymers is for example about $10^9 \Omega/\square$, and a further high performance is awaited. When the ammonium salt units are increased in order to improve this situation, it becomes water soluble, and problems of durability after film forming occur, and when using this polymer in a composition, drawbacks such as bad compatibility arise. Further, to improve the antistatic effect of a composition comprising these polymers, it is necessary to increase the polymer content, and drawbacks are pointed out such as the properties or functions other than antistaticity of the composition would be impaired.

For example, Patent Document 3 describes a polymer-type antistatic coating composition comprising a block copolymer containing a conductive segment and a hydrophobic segment. In this block copolymer, the moieties having conductivity in the polymer are accumulated by block polymerization to induce a clear phase separation to exert an antistatic effect.

However, to cause phase separation, usually a molecular weight of 10000 or more is necessary. Specifically, there is a problem that with a molecular weight less than that, no phase separation occurs, and thus cannot be used. Further, it is said to have a good solubility as it is a block polymer, while the polymers in the Examples of the reference do not dissolve in usual hydrocarbon solvents such as toluene, ether solvents such as THF, ester solvents such as ethyl acetate, alcohol solvents such as methanol, UV curable monomers such as acrylate derivatives and methacrylic derivatives, and some do not even show water solubility depending on the composition. The only possible solvent is a particular solvent such as non-proton polar solvents including dimethyl sulphoxide and dimethyl formamide. Therefore, the use thereof is limited, as it is not suitable to use in for example a non-solvent type UV curable resin, etc. or for usage where highly volatile solvent is necessary, and it can only be coated on substrate having resistance to non-proton polar solvents.

To perform additional test for the invention of the reference, the present inventors have synthesized polymers according to their method, and quaternized the polymer according to the method described in the reference. As a result, the polymer did not precipitate and became gelatinous, and the polymer could not be recovered as in the Examples of the reference.

Further, according to the reference, quaternization of polymer is performed with methyl iodide, while iodine may be the cause of coloring, and a lemon yellow coloring was generated during the additional test. Colored polymers cannot be used for applications where colorless and transparency are required such as for display.

Patent Document 4 describes a polymer antistatic agent comprising quaternary ammonium as counter cation, and it is described that the polymer antistatic agent has a superior antistatic property. However, this polymer is not a block polymer, and its molecular weight is not described.

Further Patent Document 5 describes as a composition for a golf ball, an ionomer that can be neutralized with a quaternary ammonium, specifically an ionomer having an acid on a side chain and having an acid polymer moiety neutralized with ammonium.

However, this ionomer is to improve the durability, rebounding property, abrasion resistance, etc. of the golf ball and is irrelevant with antistaticity, and it is difficult to conceive the antistatic effect therefrom. Further, it is estimated that the ionomer is a random polymer, and it is difficult that each property such as antistatic property, water repellent property, and oil repellent property is exerted at the same time in a random polymer.

On the other hand, for example, a polymer having an alkali metal salt structure of acid such as sodium salt of methacrylic acid has a low solubility and low compatibility in a composition, and the antistatic effect also tends to be low.

Further, these polymers and a composition containing these exert an antistatic function, and therefore, their surface is hydrophilic and thus the water repellency and antifouling property are poor. Further, for members of polymers etc. used for semiconductors-related products, in order to avoid performance degradation, corrosion, etc. it is said that it is necessary to control halogen atoms, as well as alkali metal and alkaline earth metal such as sodium and calcium at a ppb level, and a normal surfactant can be hard to use.

Further, recently, there is an increasing need to confer not only antistatic property but also water- and oil-repellent property and antifouling property to optical devices including displays. However, these functions and the antistatic function are contradictory, and it is said to be difficult to exert these functions at the same time.

[Patent Document 1] Japanese Laid-Open Patent Application No. 7-278400
[Patent Document 2] Japanese Laid-Open Patent Application No. 10-195422
[Patent Document 3] Japanese Laid-Open Patent Application No. 2006-104458
[Patent Document 4] U.S. Pat. No. 4,433,113
[Patent Document 5] US Patent Publication No. 2005/0288446

DISCLOSURE OF THE INVENTION

Object to be Solved by the Invention

The present invention is to provide a polymer that not only exert a high antistatic function, but also has a high solubility to solvent, high compatibility in a composition, and that contain almost no halogen atom, alkali metal or alkaline earth metal such as sodium and calcium.

Further, it is intended to provide a polymer which film surface exerts a superior water- and oil-repellent property, and a composition comprising the polymer that can exert a high antistatic function and high water- and oil-repellent property on the composition surface even when the addition amount of the polymer is small.

Means to Solve the Object

The present inventors made a keen study in order to solve the above objects, and they have found out that the above objects can be solved by using a particular compound. The present invention has been thus completed.

Specifically, the present invention relates to

[1] a linear block polymer, block star polymer, or block graft polymer, wherein at least one block is a block comprising an onium salt consisting of an anion and a counter cation on a polymer side chain;

[2] a linear block polymer, block star polymer or block graft polymer, comprising:
a) a block comprising an onium salt consisting of an anion and a counter cation on a polymer side chain, and
b) a block comprising a living anionic polymerization-inactive vinyl group, hydroxyl group or carboxyl group.

Further, the present invention relates to

[3] a linear block polymer, block star polymer or block graft polymer, comprising:
a) a block comprising an onium salt consisting of an anion and a counter cation on a polymer side chain, and
c) a block comprising a fluorocarbon group or trialkylsilyl group on a polymer side chain;

[4] a linear block polymer, block star polymer or block graft polymer, comprising:
a) a block comprising an onium salt consisting of an anion and a counter cation on a polymer side chain,
b) a block comprising a living anionic polymerization-inactive vinyl group, hydroxyl group or carboxyl group, and
c) a block comprising a fluorocarbon group or trialkylsilyl group on a polymer side chain;

[5] a linear triblock polymer, triblock star polymer or triblock graft polymer, consisting of:
a) a block comprising an onium salt consisting of an anion and a counter cation on a polymer side chain,
b) a block comprising a living anionic polymerization-inactive vinyl group, hydroxyl group or carboxyl group, and
c) a block comprising a fluorocarbon group or trialkylsilyl group on a polymer side chain.

Further, the present invention relates to

[6] the triblock polymer according to [5], wherein the block alignment is defined in the order of:
b) a block comprising a living anionic polymerization-inactive vinyl group, hydroxyl group or carboxyl group,
a) a block comprising an onium salt consisting of an anion and a counter cation on a polymer side chain, and
c) a block comprising a fluorocarbon group or trialkylsilyl group on a polymer side chain;

[7] a block star polymer or block graft polymer comprising
b) a block comprising a living anionic polymerization-inactive vinyl group, hydroxyl group or carboxyl group, and/or
c) a block comprising a fluorocarbon group or trialkylsilyl group on a polymer side chain
on the outside of the block polymer, and
a) a block comprising an onium salt consisting of an anion and a counter cation,
and optionally
b) a block comprising a living anionic polymerization-inactive vinyl group, hydroxyl group or carboxyl group, and/or
c) a block comprising a fluorocarbon group or trialkylsilyl group
on the inside;

[8] a block star polymer or block graft polymer wherein the alignment of each block is defined from the outside in the order of
c) a block comprising a fluorocarbon group or trialkylsilyl group,
b) a block comprising a living anionic polymerization-inactive vinyl group, hydroxyl group or carboxyl group, and
a) a block comprising an onium salt consisting of an anion and a counter cation on a polymer side chain;

[9] the linear block polymer or block graft polymer according to any one of [1] to [8], wherein the main chain of (a) the block comprising an onium salt consisting of an anion and a counter Cation on a polymer side chain is a polymer of living polymerizable monomers;

[10] the linear block polymer, block star polymer or block graft polymer according to [9], wherein the main chain of (a) the block comprising an onium salt consisting of an anion and a counter cation on a polymer side chain is (meth)acrylate;

[11] the linear block polymer, block star polymer or block graft polymer according to any One of [1] to [10], wherein the main chain of polymer in each block is a polymer of living polymerizable monomers;

[12] the linear block polymer, block star polymer or block graft polymer according to [11], wherein the main chain of polymer in each block is (meth)acrylate polymer;

[13] the linear block polymer, block star polymer or block graft polymer according to any one of [1] to [12], wherein the living anionic polymerization-inactive vinyl group is an allyl group.

Further, the present invention relates to

[14] the linear block polymer according to any one of [1] to [13], wherein the number average molecular weight is 20000 or less;

[15] the block star polymer or block graft polymer according to anyone of [1] to [13], wherein the number average molecular weight is 10000 or more;

[16] the linear block polymer according to [14], wherein the molecular weight distribution is 1.8 or less;

[17] the block star polymer or block graft polymer according to [15], wherein the molecular weight distribution is 1.8 or less;

[18] the polymer according to any one of [1] to [17], wherein the cation component of onium salt is any one of quaternary ammonium, quaternary phosphonium, tertiary sulfonium, quaternary imidazolium, quaternary pyridinium, quaternary thiazolium, or quaternary oxazolium.

Further, the present invention relates to

[19] a composition comprising a polymer according to any one of [1] to [18], and at least one onium salt monomer represented by the following formulae (I) to (III).

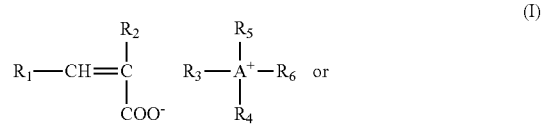

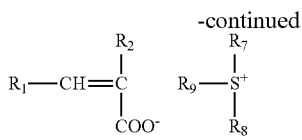

{wherein in the formula (I), $R_1$ represents a hydrogen atom or lower hydrocarbon group; $R_2$ represents a hydrogen atom, lower hydrocarbon group, $CH_2COO^-$ or $CH_2COOR_{10}$ ($R_{10}$ represents a hydrogen atom, lower hydrocarbon group, and when it is $CH_2COO^-$, its counter cation is an ammonium, quaternary ammonium, phosphonium, quaternary phosphonium or sulfonium); $R_3$ to $R_8$ represent a lower hydrocarbon group; A represents a nitrogen atom or phosphorus atom}

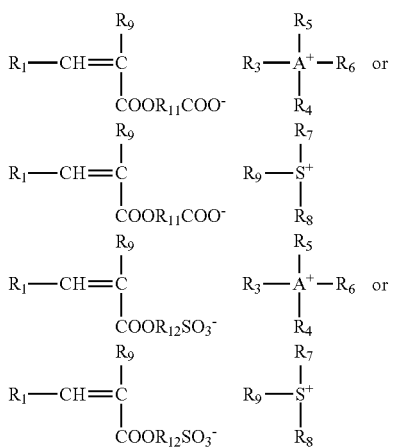

(II)

{wherein in formula (II) $R_1$, $R_3$ to $R_8$ and A have the same meaning as in formula (I); $R_9$ represents a hydrogen atom, lower hydrocarbon, or $CH_2COOR_{12}$ ($R_{12}$ represents a lower hydrocarbon group); $R_{11}$ and $R_{12}$ represent an alkylene group}

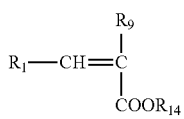

(III)

{wherein in formula (III), $R_1$ and $R_9$ have the same meaning as in formula (II); $R_{14}$ represents a group having the following formula structure;

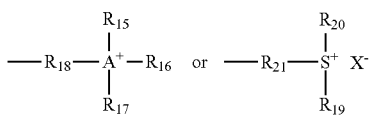

{wherein $R_{15}$ to $R_{21}$ represent a lower hydrocarbon group; X represents a halogen atom or $R_{22}$—$SO_3^-$ ($R_{22}$ represents an alkyl group, alkoxy group that may be substituted with a halogen atom, or a phenyl group that may be substituted with an alkyl group, nitro group or a halogen atom)}

Further, the present invention relates to

[20] an antistatic agent comprising the polymer according to any one of [1] to [18];

[21] a curable composition comprising the polymer according to any one of [1] to [18];

[22] a curable composition comprising a block star polymer or block graft polymer wherein the alignment of each block is defined from the outside in the order of b) a block comprising a living anionic polymerization-inactive vinyl group, hydroxyl group or carboxyl group, c) a block comprising a fluorocarbon group or trialkylsilyl group, and a) a block comprising an onium salt consisting of an anion and a counter cation on a polymer side chain; and

[23] a water repellent and oil repellent comprising the polymer according to any one of [3] to [18].

BEST MODE OF CARRYING OUT THE INVENTION ((a) A Block Comprising an Onium Salt)

The polymer of the present invention comprises an anion on the polymer side chain, and comprises a block in which the anion and a counter cation form an onium salt structure. The counter cation is not particularly limited, and examples include those which the element in the center of the counter cation is nitrogen atom, phosphorus atom, and sulfur atom, etc.

For example, a polymer which center of the cation is a nitrogen atom can be exemplified by a quaternary ammonium represented by formula (i), $$R_4N^+ \qquad (i)$$

(wherein R may be the same or different and represents a hydrocarbon group with 1 to 4 carbons).

It is a quaternary ammonium wherein each R may be the same or different hydrocarbon group with 1 to 4 carbons. Examples of "hydrocarbon group with 1 to 4 carbons" include an alkyl group with 1 to 4 carbons, and an alkenyl group with 2 to 4 carbons. Examples of alkyl group include methyl group, ethyl group, propyl group, iospropyl group, butyl group, isobutyl group, sec-butyl group, tert-butyl group; and examples of alkenyl group include vinyl group, n-propenyl group, isopropenyl group, n-butenyl group or isobutenyl group, sec-butenyl group, tert-butenyl group, etc.

Examples of quaternary ammonium specifically include alkylammonium such as tetramethylammonium, tetraethylammonium, tetrapropylammonium, tetrabutylammonium, triethylmethylammonium diethyldimethylammonium, ethyltrimethylammonium, etc.; and alkenyl group-containing alkyl ammonium such as tetravinylammonium, triethylvinylammonium, dimethyldivinylammonium, etc Further, it may be a nitrogen containing-heterocyclic compound. Examples of nitrogen containing-heterocyclic ring include a saturated or unsaturated 5- to 10-membered ring, and may have an oxygen atom, sulfur atom, etc. besides nitrogen atom, and may have an alkyl group as a substituent. Examples include quaternary imidazolium, quaternary imidazolinium, quaternary pyridinium, quaternary oxazolium, quaternary thiazolium, or alkyl substituted-derivative thereof, etc.

Examples of quaternary imidazolium specifically include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1-methyl-3-n-propyl-2,4-dimethylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzoimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethyl-2-n-undecylimidazolium, 1,3-dimethyl-2-n-heptadecylimidazolium etc., and further 2-(2'-hydroxy)ethyl-1,3-dimethylimidazolium, 1-(2'-hydroxy)ethyl-2,3-dimethylimidazolium, 2-ethoxymethyl-1,3-dimethylimidazolium, 1-ethoxymethyl-2,3-dimethylimidazolium, etc.

Examples of quaternary imidazolinium include 1,2,3,4-tetramethylimidazolinium, 1,3-dimethyl-2-ethyl-imidazolinium, 1,3,4-trimethyl-2-ethylimidazolinium, 1,3-dimethyl-2-heptylimidazolinium, 1,3-dimethyl-2-(−3'heptyl)imidazolinium, 1,3-dimethyl-2-dodecylimidazolinium etc.; examples of quaternary pyridinium include N-methylpyridinium, N-ethylpyridinium, N-n-propylpyridinium, N-isopropylpyridinium. N-n-butyl-pyridinium, etc.; examples of quaternary pyrimidium include, pyrimidium, 1,2,3-trimethyl-1,4,5,6-tetrahydropyrimidium etc.; examples of quaternary oxazolium include 3-ethyl-2-methylbenzo oxazolium, N-ethyl-isooxazolium, N-tort-butyl-5-methyl isooxazolium etc.; examples of quaternary thiazolium include 3-methyl benzothiazolium, 3-ethyl-2-methylbenzothiazolium, etc.

Among these, quaternary alkylammonium and quaternary imidazolium are preferred.

Examples of those which center of cation is phosphorus atom include quaternary phosphonium, and examples of quaternary phosphonium specifically include tetramethylphosphonium, triethylmethylphosphonium, tetraethylphosphonium, etc.

Examples of those which center of cation is sulfur atom include tertiary sulfonium, and examples of tertiary sulfonium specifically include trialkyl sulfonium such as dimethylbutyl sulfonium, octadecyl dimethylsulfonium, etc.

Anion sources on a polymer side chain include carboxylic acid, sulfonic acid and phosphorid acid, and carboxylic acid and sulfonic acid are preferred. More preferably, examples of aliphatic monomer of anion source on a polymer side chain include methacrylic acid, and a sulfonic acid generated by reacting methacrylic acid and 1,3-propane sultone and 1,4-butane sultone. Moreover, sulfonic acid generated by reacting carboxyl alkyl oxystyrene such as 4-carboxy methyl oxystyrene and its carboxylic acid with 1,3-propane sultone or 1,4-butane sultone can be exemplified.

As for the amount of anion source on a polymer side chain, the monomer unit to be the anion source (e.g. unit of methacrylic acid) is 20 mol % or more, and more preferably 30 mol % or more at a composition molar ratio with respect to the total monomer units of the polymer. When the amount of anion source on the polymer side chain is too small, the counter cation amount to be introduced decreases, and the antistatic effect perishes.

As for the amount of onium salt on a polymer side chain, from the viewpoint of exerting antistatic effect, the unit forming onium salt is 10 mol % or more, preferably 20 mol % or more, and more preferably 30 mol % or more at a molar ratio with respect to the total monomer units of the polymer.

The onium salt on a polymer side chain can be obtained by neutralizing a part or whole of anion source on the polymer side chain. All of the anion source on the polymer side chain may be neutralized to be a salt, while only a part may be a salt.

The anion source may form a main chain by polymerizing monomers having an anion source, or a compound having an anion moiety may be bound as a side chain, after forming the main chain by polymerizing monomers not having anion source. For both cases, it suffices that an anion moiety is present as a pendant of the main chain.

The main chain of a block is not particularly limited as long as it is a polymer of living polymerizable monomers, and examples include those having an anion polymerizable unsaturated binding, and for example, styrene monomers, (meth) acrylic acid ester monomers, or conjugated diene monomers can be preferably exemplified as monomers.

Specifically, nucleus-substituted styrene (styrene having a substituent in the aromatic ring) etc. can be exemplified as styrene monomers. A nucleus substituent is not particularly limited as long as it is a group being inactive to an anion species having a polymerization initiating ability, and an anion species not having a polymerization initiating ability. Specific examples include an alkyl group, alkoxyalkyl group, alkoxy group, alkoxyalkoxy group, t-butoxycarbonyl group, t-butoxycarbonyl methyl group, tetrahydropyranyl group, etc. These may be used alone or by combining two or more.

Examples of conjugated diene monomers include butadiene monomers. Specific examples include 1,3-butadine, isoprene, 2,3-dimethylbutadiene, 2-ethyl-1,3-butadiene, 1,3-pentadiene, etc. These may be used alone or by combining two or more.

Further, as (meth)acrylic acid ester monomers, those which ester alcohol residues have 1 to 20 carbons are preferred from the viewpoint of reactivity. Specific examples include methyl ester, ethyl ester, isopropyl ester, n-butyl ester, etc., and primary or secondary esters are preferred. These may be used alone or by combining two or more.

Specifically, examples of monomers containing a carboxyl group on a polymer side chain include methacrylic acid, etc. At the time of anionic polymerization, these carboxyl groups are protected with tertiary groups such as t-butyl group and 1-ethylcyclohexyl group, or 1-ethoxyethyl group, 1-pyranyl group, etc., and then deprotected after polymerization to be used.

For example, 1-ethoxyethyl (meth)acrylate, 1-pyranyl methacrylate, t-butyl methacrylate, 1-ethylcyclohexyl methacrylate, etc. are polymerized and decomposed with acid to generate methacrylic acid. Then, polymers may be purified, and then neutralized with for example tetramethylammonium hydroxide (TMAOH), etc. to make an ammonium salt structure.

Further, for example, a polymer comprising sulfonium as a counter cation on the side chain may be synthesized by reacting dialkylsulfide such as dimethyl sulfide with a sulfonium salt obtained by reacting alkyl halide such as methyl iodide, dimethyl sulfate, or alkyl sulfonate such as methyl methanesulfonate, etc., and with an alkali metal salt such as sodium salt and potassium salt, etc. of a polymer comprising a carboxylic acid or sulfonic acid on the side chain, and by performing salt exchange.

Further, for example, a polymer comprising phosphonium as a counter cation on the side chain may be synthesized by reacting trialkyl phosphine such as tributyl phosphine with a phosphonium salt obtained by reacting alkyl halide such as methyl iodide, or alkyl sulfonate such as dimethyl sulfate and methyl methanesulfonate, etc., and with an alkali metal salt such as sodium salt and potassium salt, etc. of a polymer comprising a carboxylic acid or sulfonic acid on the side chain, and by performing salt exchange.

In case of obtaining block (a) by polymerizing 2 or more monomers, these monomers may be block-polymerized or it may be random polymerized. When copolymerizing 2 or more monomers, for example, monomers having groups to be the anion source may be combined, or a monomer having a group to be the anion source and a monomer not having a group to be the anion source may be combined. Specifically, the combination of 1-ethoxyethyl methacrylate and methyl methacrylate, etc. can be exemplified.

In case of obtaining block (a) by copolymerizing 2 or more monomers, a unit having an onium salt and a unit not having an onium salt may be combined within the range where the antistatic property is not impaired. Preferred examples of monomers to copolymerize include, ester methacrylate having 1 to 4 carbons such as methyl methacrylate, ethyl methacrylate, n-propyl methacrylate, i-propyl methacrylate, n-butyl methacrylate, t-butyl methacrylate, s-butyl methacrylate, etc.

((b) A block comprising a living anionic polymerization-inactive vinyl group, hydroxyl group or carboxyl group)

For the polymer main chain of a block comprising a living anionic polymerization-inactive vinyl group, hydroxyl group or carboxyl group, living polymerizable monomers can be used, similarly as for block (a). The monomer may have a living anionic polymerization-inactive vinyl group, hydroxyl group or carboxyl group as a side chain of a monomer on the main chain, and a compound having such group may be further bound to a monomer on the main chain. However, it is preferred to use a monomer having a living anionic polymerization-inactive vinyl group, hydroxyl group or carboxyl group.

Examples of living anionic polymerization-inactive vinyl group include an allyl group. Examples of monomers comprising a living anionic polymerization-inactive vinyl group on the polymer side chain include allyl methacrylate, vinyl methacrylate, etc., and allyl methacrylate is preferred. These vinyl groups are relatively stable, and the storage stability is not worsened even when the composition ratio increases. Polymers comprising this moiety are preferably used mainly when using in a heat- or photo-curable composition by chain polymerization of unsaturated binding.

Examples of monomers comprising a hydroxyl group on the polymer side chain include 2-hydroxyethyl methacrylate and 2-hydroxypropyl methacrylate, and at the time of anionic polymerization, these hydroxyl groups are protected with a silyl group such as trimethyl silyl group and t-butyl dimethyl silyl group, etc., 1-ethoxyethyl group or 1-pyranyl group etc., and deprotected after polymerization to be used. Polymers comprising this unit are preferably used when used in a urethane curable composition.

Examples of monomers comprising a carboxyl group on the polymer side chain include methacrylic acid, and at the time of anionic polymerization, these carboxyl groups are protected with tertiary groups such as t-butyl group and 1-ethyl cyclohexyl group, etc., 1-ethoxyethyl group, 1-pyranyl group, etc., and deprotected after polymerization to be used.

These monomers may be used alone, or by combining 2 or more.

When obtaining block (b) by copolymerizing 2 or more monomers, these monomers may be block-polymerized or it may be random polymerized. When copolymerizing 2 or more monomers, for example, monomers comprising a polymerization inactive vinyl group may be combined, or a monomer comprising a polymerization inactive vinyl group and a monomer not comprising a polymerization inactive vinyl group may be combined. Specifically, the combination of allyl methacrylate and methyl methacrylate, etc. can be exemplified.

As for the amount of monomers comprising a living anionic polymerization-inactive vinyl group, hydroxyl group or carboxyl group on the polymer side chain, the monomer unit comprising a living anionic polymerization-inactive vinyl group, hydroxyl group or carboxyl group on the side chain (e.g. ally methacrylate) is 1 mol % or more, preferably 5 mol % or more, and more preferably 10 mol % or more at a composition molar ratio with respect to the total monomer units of the polymer. When the amount of unsaturated group, hydroxyl group or carboxyl group on the polymer side chain is too small, the water- and oil-repellent property, and the duration of the antistatic effect of the curable composition decrease.

((c) A block comprising a fluorocarbon group or trialkylsilyl group on a polymer side chain)

For the polymer main chain of a block comprising a fluorocarbon group or trialkylsilyl group on a polymer side chain, living polymerizable monomers can be used, similarly as for block (a). It may have a fluorocarbon group or trialkylsilyl group as a side chain of a monomer on the main chain, or a compound having such group may be further bound to a monomer of the main chain. However, it is preferred to use a monomer having a fluorocarbon group or trialkylsilyl group.

Examples of monomers comprising a fluorocarbon group on polymer side chain include 1H,1H,2H,2H-perfluorooctyl methacrylate, 1H,1H,2H,2H-perfluorodecyl methacrylate, 1H,1H,5H-octafluoropentyl methacrylate, 1,1,1,3,3,3-hexafluoroisopropyl methacrylate, 2,2,2-trifluoroethyl methacrylate, and fluorinated polyethylene glycol methacrylate, and 1H,1H,2H,2H-perfluorodecyl methacrylate can be preferably exemplified.

Examples of monomers comprising a trialkylsilyl group include 3-trimethylsilylpropyl methacrylate, 3-[tris(trimethylsilyloxy)silyl]propyl methacrylate, and polysiloxane propyl methacrylate having a trimethylsilyl group at its end, and 3-[tris(trimethylsilyloxy)silyl]propyl methacrylate can be preferably exemplified.

These monomers may be used alone, or by combining 2 or more.

When obtaining block (c) by copolymerizing 2 or more monomers, these monomers may be block-polymerized or it may be random polymerized. When copolymerizing 2 or more monomers, for example, monomers comprising a fluorocarbon group on the side chain may be combined, or a monomer comprising a fluorocarbon group and a monomer not comprising a fluorocarbon group, etc. on the side chain may be combined. Specifically, the combination of perfluorooctyl methacrylate and methyl methacrylate, etc. can be exemplified.

When obtaining block (c) by copolymerizing 2 or more monomers, it is preferred that monomers not comprising a fluorocarbon group are combined within a range so that the water- and oil-repellent property are not impaired. Copolymerizing monomers are preferably nonpolar monomers.

The amount of monomers comprising a fluorocarbon group or monomers comprising a trialkylsilyl group on the polymer side chain is 1 mol % or more, and preferably 3 mol % or more at a composition molar ratio. When the amount of the moiety expressing water- and oil-repellent property on the polymer side chain is too small, not only the water- and oil-repellent property decreases but also the antistatic effect decreases.

Further, anion polymerizable monomers including alkyl methacrylate such as methyl methacrylate and butyl methacrylate, or styrene and styrene derivatives such as 4-butoxystyrene, and diene compounds such as butadiene and isoprene can be copolymerized.

(Polymers)

The polymer of the present invention is a linear block polymer, block star polymer or block graft polymer, wherein at least one block is a block in which an anion and a counter cation on the polymer side chain form an onium salt.

In order to sufficiently exert the polymer properties or functions, a linear block polymer, block star polymer or block graft polymer consisting of ternary or more blocks is preferred, and in order to exert each function of antistatic, water- and oil-repellent property, it is more preferred to be a linear triblock polymer, triblock star polymer or triblock graft polymer.

Herein, a block star polymer means a structure in which the arm part of the star polymer is a block polymer. In case of a block star polymer, the core structure and composition are not particularly limited, and for example, multifunctional aromatic compounds such as 1,1,2,2,-tetrakis(4-bromomethylphenyl) ethane, 1,1,2,2,-tetrakis(4-iodomethylphenyl) ethane, etc., multifunctional methacrylate such as ethylene glycol dimethacrylate, etc., or dendritic compounds having a halogen at the outermost shell, etc. can be the core. As multifunctional methacrylate, a difunctional methacrylate is preferred.

In case of a block star polymer, it may be bound with the core after synthesizing a block, or it may be synthesized by extending the block polymer from the core.

Further, a block graft polymer means a structure in which each branch (graft) branched from the stem polymer is a block polymer. Here, the structure and composition of the stem polymer are not particularly limited, and examples include polymers having a styrene skeleton or methacrylic acid skeleton, etc.

The molecular weight and molecular weight distribution of the polymer of the present invention is not particularly limited, and in case of a linear block polymer, it is preferred that the number average molecular weight is 20000 or less and the molecular weight distribution is 1.8 or less. The number average molecular weight is more preferably 1500 to 10000, further more preferably 3000 to 10000, and the molecular weight distribution is more preferably 1.3 or less, and further more preferably 1.2 or less.

Here, a molecular weight distribution of 1.8 or less relates to a level of molecular weight distribution obtained by measuring the polymers by gel permeation chromatography (GPC). When producing a polymer, when it is synthesized by protecting the functional group of the polymer, the level of molecular weight distribution of the polymer after deprotection can be increased apparently as compared to the polymer before deprotection. This increase is due to the polarity change of before and after deprotection, etc., and it is assumed to be a phenomenon caused by measurement, and that the molecular weight distribution is not actually spread. In the present invention, the molecular weight distribution of a polymer after deprotection is preferably 1.8 or less, and more preferably 1.3 or less. The molecular weight distribution of a polymer before deprotection is preferably 1.3 or less, and more preferably 1.2 or less.

When the number average molecular weight is 20000 or less, and used in a curable composition, the viscosity can be kept low, which is superior in handling and coating properties.

Here, when referred to as a number average molecular weight of 20000 or less, it may mean that the number average molecular weight of 1 polymer is 20000 or less, or that the total number average molecular weight is 20000 or less when combining a polymer with a number average molecular weight of 20000 or more and a polymer of 20000 or less.

On the other hand, in case of a block star polymer or block graft polymer, it is preferred that the number average molecular weight is 10000 or more, and more preferably 20000 to 1000000. In case of a block star polymer or block graft polymer, from the viewpoint of the membrane strength when the polymer is filmed, or of the relative ratio of the block polymer moiety with respect to the total polymer, it is preferred that the molecular weight is 10000 or more.

Here, when referred to a number average molecular weight of 10000 or more, it may mean that the number average molecular weight of 1 polymer is 10000 or more, or that the total number average molecular weight is 10000 or more when combining a polymer with a number average molecular weight of 10000 or more, and a polymer of 10000 or less.

In case of a binary block polymer, it is preferred to be a block polymer comprising a) a block comprising an onium salt consisting of an anion and a counter cation on a polymer side chain; and b) a block comprising a living anionic polymerization-inactive vinyl group, hydroxyl group or carboxyl group.

The content of each block and each functional group is not particularly limited, and the monomer unit having an onium salt is preferably 10 mol % or more, more preferably 20 mol % or more, further more preferably 30 mol % or more, and particularly preferably 40 mol % or more with respect to the total monomer units of the polymer.

The amount of monomer unit comprising a living anionic polymerization-inactive vinyl group, hydroxyl group or carboxyl group with respect to the total monomer units of the polymer is preferably 5% or more, more preferably 10% or more, and particularly preferably 20% or more.

To these binary block polymers, monomers such as methyl methacrylate that do not affect directly the function of the polymer can be copolymerized.

Further, in case of a binary block polymer, a block polymer comprising a) a block comprising an onium salt consisting of an anion and a counter cation on a polymer side chain; and c) a block comprising a fluorocarbon group or trialkylsilyl group on a polymer side chain is also preferred.

The content of each block and each functional group is not particularly limited, and the monomer unit having an onium salt is preferably 10 mol % or more, preferably 20 mol % or more, more preferably 30 mol % or more, and particularly preferably 40 mol % or more with respect to the total monomer units of the polymer.

The amount of monomer unit comprising a fluorocarbon group or trialkylsilyl group on a polymer side chain is preferably 5% or more, more preferably 10% or more, and particularly preferably 20% or more with respect to the total monomer units of the polymer.

To these binary block polymers, monomers such as methyl methacrylate that do not affect directly the function of the polymer can be copolymerized.

In case of a binary block star polymer or block graft polymer, the alignment of each block is not particularly limited, and it is preferred that the alignment has b) a block comprising a living anionic polymerization-inactive vinyl group, hydroxyl group or carboxyl group or c) a block comprising a fluorocarbon group or trialkylsilyl group on the outside, and a) a block comprising an onium salt consisting of an anion and a counter cation on a polymer side chain on the inside.

Further, in case of a ternary block polymer, a block polymer having a a) a block comprising an onium salt consisting of an anion and a counter cation on a polymer side chain, b) a block comprising a living anionic polymerization-inactive vinyl group, hydroxyl group or carboxyl group, and
c) a block comprising a fluorocarbon group or trialkylsilyl group on a polymer side chain is preferred.

The content of each block and each functional group is not particularly limited, and the monomer unit having an onium salt is preferably 10 mol % or more, preferably 20 mol % or more, more preferably 30 mol % or more, and particularly preferably 40 mol % or more with respect to the total monomer units of the polymer.

The amount of monomer unit comprising living anionic polymerization-inactive vinyl group, hydroxyl group or carboxyl group is preferably 5% or more, more preferably 10% or more, and particularly preferably 20% or more with respect to the total monomer units of the polymer.

The amount of monomer unit comprising a fluorocarbon group or trialkylsilyl group on a polymer side chain is preferably 5% or more, more preferably 10% or more, and particularly preferably 2.0% or more with respect to the total monomer units of the polymer.

To these ternary block polymers, monomers such as methyl methacrylate that do not affect directly the function of the polymer can be copolymerized.

Further, in either case, monomers contained in each block may be mixed with one another, within the range accepted by the intended use.

When a ternary block polymer is a linear block polymer, the alignment of each block is not particularly limited, and it is preferred that the alignment is defined in the order of
b) a block comprising a living anionic polymerization-inactive vinyl group, hydroxyl group or carboxyl group,
a) a block comprising an onium salt consisting of an anion and a counter cation on a polymer side chain; and
c) a block comprising a fluorocarbon group or trialkylsilyl group on a polymer side chain.

When the ternary block polymer is a block star polymer or block graft polymer, the alignment of each block is not particularly limited, and it is preferred that the alignment is defined as to have on the outside, in the order of
b) a block comprising a living anionic polymerization-inactive vinyl group, hydroxyl group or carboxyl group, and/or
c) a block comprising a fluorocarbon group or trialkylsilyl group,
and on the inside, in the order of
a) a block comprising an onium salt consisting of an anion and a counter cation on a polymer side chain, and optionally
b) a block comprising a living anionic polymerization-inactive vinyl group, hydroxyl group or carboxyl group, and/or
c) a block comprising a fluorocarbon group or trialkylsilyl group.

Further, the preferred alignment can be selected according to the use of the polymer, and for example, when using the polymer alone, it is preferred that the alignment is from the outside
c) a block comprising a fluorocarbon group or trialkylsilyl group,
b) a block comprising a living anionic polymerization-inactive vinyl group, hydroxyl group or carboxyl group, and
a) a block comprising an onium salt consisting of an anion and a counter cation on a polymer side chain. When using in a curable composition, it is preferred that the alignment is, from the outside
b) a block comprising a living anionic polymerization-inactive vinyl group, hydroxyl group or carboxyl group,
c) a block comprising a fluorocarbon group or trialkylsilyl group, and
a) a block comprising an onium salt consisting of an anion and a counter cation on a polymer side chain.

The polymer of the present invention can further contain a different block and/or moiety besides the above blocks (a), (b) and (c), and for example, it can comprise an alkyl methacrylate such as methyl methacrylate and butyl methacrylate, etc., styrene, styrene derivatives such as 4-butoxystyrene, and vinyl compounds such as butadiene, isoprene, etc.

One or two or more components other than (a), (b) and (a) can be contained in the polymer.

(Method for Producing a Polymer)

The method for producing the polymer of the present invention is not particularly limited, and it is preferred to polymerize the main chain of each block by living polymerization to form a block polymer. Living polymerization include living radical polymerization and living anionic polymerization. Among these, living anionic polymerization is more preferred.

When making a binary or more block polymer, it is possible to form a block polymer by reacting consecutively each block, or it is possible to bind each block after reacting each block separately. Living anionic polymerization is preferred from the viewpoint that it is possible to control stringently the composition and molecular weight.

When producing a linear block polymer by living anionic polymerization, for example, it is possible to polymerize by dropping the intended monomer to a solvent added with an additive and polymerization initiator. At that time, in order to make a block polymer having the intended alignment, monomers of each block are dropped sequentially and reacted in order to obtain the intended alignment.

In order to polymerize monomers of a certain block, and then polymerize monomers of the next block, dropping of the monomers of the next block is initiated after the polymerization reaction of the previous block is finished. The progress of the polymerization reaction can be confirmed by detecting the remaining level of monomers by gas chromatography or liquid chromatography. Further, after the dropping of monomers of the previous block is finished, though it depends on the types of monomers or solvents, the dropping of monomers of the next block can be initiated after stirring for 1 minute to 1 hour.

When plural types of monomers are contained in the block to polymerize, they may be dropped separately, or at the same time.

When producing a linear block polymer by living radical polymerization, the reaction may be performed similarly as the living anionic polymerization, or it can be produced as follows after the monomers of a certain block are polymerized, the polymers can be purified before polymerizing the next monomers to remove the residues of the monomers in the previous reaction, and then polymerize the next monomers. When it is preferred that monomers of each block are not mixed with each other, it is preferred to purify the polymers.

In case of a block star polymer, the arm part of the star polymer is the above-mentioned block polymer, and it can be produced similarly as the linear block polymer.

When producing a block star polymer by living anionic polymerization, it can be produced by synthesizing a block polymer, and reacting the terminal anions of the block polymer with, for example, functional aliphatic halides such as 1,1,2,2,-tetrakis(4-bromomethylphenyl) ethane, or by reacting multifunctional methacrylate such as ethylene glycol dimethacrylate.

When producing a block star polymer by living radical polymerization, for example, a block polymer can be synthesized by using a halogen present at the outermost shell of the dendritic core compound as initiating point. Examples of dendritic compounds having a halogen at, the outermost shell include, for example, a compound in which bromoisobutyryl bromide is reacted with an ester-type dendrimer having a hydroxyl group at the outermost shell. Examples of ester-type dendrimer having a hydroxyl group at the outermost shell include dendrimer from Hakuto Co. Ltd., and "Boltorn (registered trademark)" (Perstorp).

In case of a block graft polymer, the branch (graft)) polymer part is the above-mentioned block polymer, and these parts can be produced similarly as the linear block polymer.

When producing a block graft polymer by living anionic polymerization, the following methods can be exemplified: a production method comprising reacting a terminal anion of the block polymer with those having aliphatic halogens on the side chain of the stem such as styrene skeleton and methacrylic acid skeleton; a method of synthesizing a block polymer by introducing diphenylethylene etc. to the side chain of the stem, reacting an initiating agent thereto, and polymerizing to side chain therefrom; and a method comprising introducing a hydroxyl group to the terminal of a diblock polymer, and polymerizing a macromer provided by a methacrylic-acid esterification.

When producing a block graft polymer by living radical polymerization, for example, the following methods can be exemplified: a method comprising reacting bromoisobutyryl bromide to the stem polymer comprising 2-hydroxyethyl methacrylate, and synthesizing a block polymer by using it as initiating point, and a method comprising introducing a hydroxyl group to the terminal of the block polymer, and polymerizing a macromer that has been esterized with methacrylic acid.

The types of monomers used in the present invention are as described above. The anionic polymerization initiating agents used for polymerizing monomers are not particularly limited as long as it is a nucleophile, and has a function of initiating polymerization of anionic polymerizable monomers. For example, alkali metal, organic alkali metal compound, etc. can be used.

Examples of alkali metal include lithium, sodium, potassium, cesium, etc. Examples of organic alkali metal compound include alkylated, allylated and arylated compounds of the above alkali metal, and alkyl lithium is particularly preferred. Specific examples include ethyl lithium, n-butyl lithium, sec-butyl lithium, t-butyl lithium, ethyl sodium, lithium biphenyl, lithium naphthalene, lithium triphenyl, sodium naphthalene, potassium naphthalene, α-methylstyrene sodium dianion, 1,1-diphenylhexyl lithium, 1,1-diphenyl-3-methylpentyl lithium, 1,4-dilithio-2-butene, 1,6-dilithiohexane, polystyryl lithium, cumyl potassium, cumyl cesium, etc. These anionic polymerization initiating agents may be used alone or by combining 2 or more of these.

The amount used of the anionic polymerization initiating agent is usually 0.0001 to 0.2 equivalents, and preferably 0.0005 to 0.1 equivalents with respect to the total anionic polymerizable monomer to be used. By using an anionic polymerization initiating agent within this range, the intended polymer can be produced efficiently.

The polymerization temperature of the present invention is not particularly limited as long as it is a temperature range in which no side reactions such as transfer reaction and termination reaction occur, and monomers are consumed to complete the reaction, and it is preferred to be conducted within a temperature range from −100° C. to the boiling point of the solvent or less. Further, the concentration of the monomer with respect to the polymerization solvent is not particularly limited, and it is generally 1 to 40 weight %, and preferably 2 to 15 weight %.

The polymerization solvent used in the production method of the present invention is not particularly limited as long as it is a solvent that is not associated with the polymerization reaction, and that has a compatibility with the polymer. Specific examples include ether compounds such as diethyl ether, tetrahydrofuran (THF), dioxane and trioxane; polar solvents such as tetramethyl ethylene diamine and tertiary amines including hexamethyl phosphoric triamide, nonpolar solvents or low-polar solvents such as aliphatic, aromatic or alicyclic hydrocarbon compounds including hexane and toluene. These solvents may be used alone or as a mixed solvent by combining 2 or more of these. In the production method of the present invention, polymerization can be controlled accurately even when combining a nonpolar solvent or low polar solvent with a polar solvent. For example, a nonpolar solvent or low polar solvent can be used in an amount of 5 vol % or more, 20 vol % or more, or 50 vol % or more with respect to the total volume of the solvent.

In the present invention, dialkyl zinc such as diethyl zinc, dialkyl magnesium such as dibutyl magnesium, and organic metal such as triethyl aluminum can be optionally used as polymerization stabilizer, or purifying agent of monomers or solvent.

In the present invention, additives such as alkali metal salt or alkaline earth metal salt can be added according to need at the time of initiating the polymerization or during the polymerization. Specific examples of such additives include mineral acid salts or halides of sulfate, nitrate, borate of sodium, potassium, barium and magnesium. More specifically, chlorides, bromides, iodides of lithium and barium; lithium borate, magnesium nitrate, sodium chloride, and potassium chloride can be exemplified. Among these, halides of lithium, for example lithium chloride, lithium bromide, lithium iodide, and lithium fluoride are preferred, and lithium chloride is particularly preferred.

(Use of Polymer)

The polymer of the present invention has an excellent antistatic property, and can be preferably used as an antistatic agent, alone or by adding to other materials.

Each property of antistatic, water- and oil-repellent property is exerted from each block of the block polymer. The antistatic property is exerted mainly from the a) block comprising an onium salt consisting of an anion and a counter cation on a polymer side chain. Water- and oil-repellent properties are exerted mainly from the c) block comprising a fluorocarbon group or trialkylsilyl group on a polymer side chain, and this block also has a function of helping exerting the antistatic function by bleeding out the polymer of the present invention on the surface of the composition. The b) block comprising a living anionic polymerization-inactive vinyl group, hydroxyl group or carboxyl group contributes to the reaction with a resin in a composition, and has a function to enhance the adhesion with the substrate, etc.

When using the polymer of the present invention alone, a block star polymer or block graft polymer is more preferred than the linear block polymer as a polymer expressing high antistatic property, and water- and oil-repellent property. In order to enhance the antistatic property, it suffices to increase the onium salt content in the polymer. However, when the content is increased excessively, the polymer will dissolve in water and the function as a single film will be impaired. However, in case of a block star polymer or block graft polymer, even when the onium salt content is increased, the water solubility can be suppressed, and there is a tendency that the function as a single film is hard to be impaired.

When using as an antistatic agent, the polymer of the present invention can be used by dissolving it in a solvent according to need. Examples of solvent include for example, methanol, ethanol, isopropyl alcohol, acetone, methyl ethyl ketone, methyl isobutyl ketone, cyclohexane, N-methyl pyrolidone, ethyl acetate, butyl acetate, methyl cellosolve, ethyl cellosolve, cellosolve acetate, ethyl cellosolve acetate, butyl cellosolve acetate, carbitol acetate, ethyl carbitol acetate, butyl carbitol acetate, propylene glycol monomethyl ether acetate, propylene glycol monoethyl ether acetate, toluene, xylene, chloroform, 1,2-dichloroethane, dichloromethane, dimethyl sulfoxide, dimethylformamide, tetrahydrofuran, dimethyl acetamide, etc. or water containing acid or alkali, and alcohol, etc.

Examples of substrate for using the antistatic agent include a sheet consisting of a transparent glass or plastic, etc., and plate-like molded body. Examples of plastic include polyethylene terephthalate, triacetyl cellulose, diacetyl cellulose, cellulose acetate butyrate, polyethersulfone, acryl resin, polyurethane resin, polyester resin, polycarbonate, polysulfone, polyether, trimethylpentene, polyetherketone, acrylonitrile, etc.

Known methods are used as a method for coating an antistatic agent to these substrates, and for example, known coating methods such as direct gravure coating method, gravure reverse coating method, roll coating method, slide dye coating method, slit dye coating method, comma coating method, spin coating method, bar coating method, etc. can be used.

Further, the polymer of the present invention can be used by adding to a curable composition. Particularly, a block polymer with a number average molecular weight of 10000 or less and having a molecular weight distribution of 1.8 or less is preferred to keep the viscosity of the composition low, or to express a superior antistatic property, water- and oil-repellent property of the cured product.

Curable composition can be roughly classified into heat curing-type and photo curing-type. Its curing method varies from epoxy curing, urethane curing and curing by chain polymerization of unsaturated binding. The onium salt-containing polymer of the present invention can be used regardless of its curing method, while curing by chain polymerization of unsaturated binding is preferred, and photo curing-type by chain polymerization of unsaturated binding is more preferred. Most of the photo curing-type curable composition uses monofunctional or multifunctional monomers or oligomers containing acrylic acid esters or methacrylic acid esters, the polymer of the present invention comprising a living anionic polymerization inactive vinyl group on the polymer side chain is preferably used.

When using the polymer of the present invention by adding to a curable composition, the alignment of each block of the polymer is not particularly limited, but it is preferred that the alignment of each block of the polymer is defined from the outside, in the order of
b) a block comprising a living anionic polymerization-inactive vinyl group, hydroxyl group or carboxyl group;
c) a block comprising a fluorocarbon group or trialkylsilyl group;
a) a block comprising an onium salt consisting of an anion and a counter cation on a polymer side chain.

Further, the polymer of the present invention alone, or a composition comprising the polymer of the present invention can be preferably used as a water repellent and oil repellent. When using a composition comprising the polymer of the present invention as a water repellent and oil repellent, the other components are not particularly limited, and these may be existing resin, gum, or aqueous or oily liquid medium other than the polymer of the present invention, various powders, or a mixture thereof.

Examples of resin used in water repellent and oil repellent as other components include thermoplastic resin such as polyethylene, polypropylene, polystyrene, polymethyl methacrylate, polyvinyl chloride, polyvinyl acetate, polycarbonate, silicone and wax, etc., derivatives thereof, and copolymers containing the same; thermocurable resin such as epoxy resin, phenol resin, polyimide, polyurethane, melamine resin, urea resin, polyester resin, unsaturated polyester resin, etc. and derivatives thereof. Examples include natural rubber, and synthetic rubber including butadiene rubber, styrene-butadiene rubber, urethane rubber, epichlorohydrin rubber, silicone rubber and thermoplastic elastomers, etc.

Further, the polymer of the present invention mentioned in the above in detail, and the composition comprising at least one onium salt monomer represented by the following formulae (I) to (III) are also a composition of the present invention.

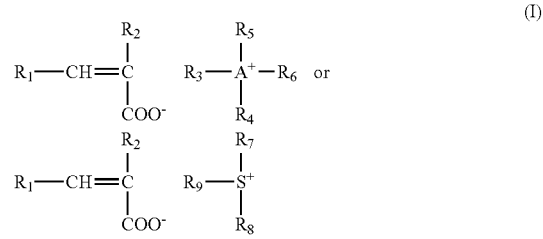

{wherein in the formula (I), $R_1$ represents a hydrogen atom or lower hydrocarbon group; $R_2$ represents a hydrogen atom, lower hydrocarbon group, $CH_2COO^-$ or $CH_2COOR_{10}$ ($R_{10}$ represents a hydrogen atom or lower hydrocarbon group, and when it is $CH_2COO^-$, its counter cation is ammonium, quaternary ammonium, phosphonium, quaternary phosphonium or sulfonium); $R_3$ to $R_8$ represent a lower hydrocarbon group; A represents a nitrogen atom or phosphorus atom}

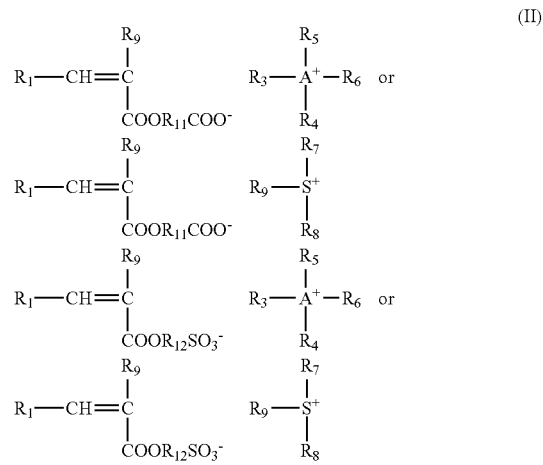

{wherein in formula (II), $R_1$, $R_3$ to $R_8$ and A have the same meaning as in formula (I); $R_9$ represents a hydrogen atom, lower hydrocarbon, or $CH_2COOR_{13}$ ($R_{13}$ represents a lower hydrocarbon group); $R_{11}$ and $R_{12}$ represent an alkylene group}.

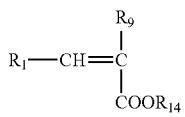
(III)

{wherein in formula (III), $R_1$ and $R_9$ have the same meaning as in formula (II); $R_{14}$ represents a group having the following formula structure;

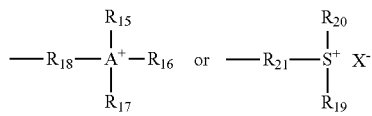

{wherein $R_{15}$ to $R_{21}$ represent a lower hydrocarbon group; X represents a halogen atom or $R_{22}$—$SO_3^-$ ($R_{22}$ represents an alkyl group, alkoxy group that may be substituted with a halogen atom, or a phenyl group that may be substituted with an alkyl group, nitro group or a halogen atom)}

In the above formulae (I) to (III), lower hydrocarbon group of $R_1$ to $R_{10}$, $R_{13}$ and $R_{15}$ to $R_{21}$ have the same meaning as R in formula (i). Examples of alkylene group of $R_{11}$ and $R_{12}$ include alkylene group with 1 to 4 carbons, and specific examples include methylene group, ethylene group, propylene group, isopropylene group, butylene group, isobutylene group, etc.

Examples of alkyl group of $R_{22}$ include the same as the alkyl group of R in formula (i), as well as alkyl group such as n-pentyl group, isopentyl group, neopentyl group, t-pentyl group, n-hexyl group, isohexyl group, n-heptyl group, n-octyl group, n-decyl group, n-octadecyl group, etc. Examples of alkoxy group include for example C1 to 4 alkoxy group such as methoxy group, ethoxy group, and isopropoxy group, etc. These groups and phenyl group may be substituted by a halogen atom, particularly by a fluorine atom, and, examples include difluoromethyl group, 1,2-difluoroethyl group, 1,3-fluorophenyl group, trifluoromethyl group, perfluoroethyl group, etc.

In case of a curable composition comprising at least one onium salt monomer represented by formulae (I) to (III), the content of onium salt monomer is preferably 30% or less, and more preferably 20% or less. The reason is that when the content is too large, the onium salt monomer will not be dissolved in a composition, and the effect does not change even by adding more than a certain amount.

In the following, the present invention will be explained in detail by referring to the Examples, while the scope of the present invention will not be limited to the Examples.

EXAMPLE

Hereinafter, tetrahydrofuran is referred to as THF, n-butyl lithium as n-BuLi, methacrylic acid as MA, allyl methacrylate as AMA, 3-[tris(trimethylsilyloxy)silyl]propyl methacrylate as TMSPMA, 1H,1H,2H,2H-perfluorooctyl methacrylate as PFOMA, 1H,1H,2H,2H-perfluorodecyl methacrylate as PFDMA, ethylene glycol dimethacrylate as EDMA, styrene as ST, methyl methacrylate as MMA, 2-hydroxyethyl methacrylate as HEMA, vinyl methacrylate as VMA, glycidyl methacrylate as GMA, and 2-dimethyl aminoethyl methacrylate as DMAEMA.

The symbol "/" denotes a block, "•" a random copolymerization, and the numbers in parenthesis ( ), represent the molar ratio of copolymerization.

Synthesis Example 1

Synthesis of THSPMA/AMA•MA (26-32-42) Polymer

To a 200 mL-four-neck flask which was sufficiently subjected to nitrogen substitution, THF (168.2 g) and a solution of 3.80% lithium chloride in THF (5.39 g:4.8 mmol) were added, and n-BuLi solution (1.13 g; 2.7 mmol) was added at room temperature while stirring with a stirrer, and the mixture was stirred for 45 minutes. Then, the mixture was cooled down to −50° C., and stirred for 35 minutes. Next, n-BuLi solution (2.06 g; 5.0 mmol) was added, stirred for 8 minutes, and then added with t-butyl crotonate (0.44 g; 3.1 mmol) and stirred for 17 minutes. Then, a solution of diethyl zinc in hexane (3.98 g; 5.5 mmol) was added and then, THF (8.2 g) was added with 3-[tris(trimethylsilyloxy)silyl]propyl methacrylate (TMSPMA) (12.76 g; 30.2 mmol), the solution dehydrated with a solution of diethyl zinc in hexane (0.52 g; 0.7 mmol) was dropped over 20 minutes, and stirred for 10 minutes after the dropping was completed. Next. THF (10.6 g) was added with allyl methacrylate (AMA) (4.53 g; 35.9 mmol) and 1-ethoxyethyl methacrylate (MA) (7.61 g; 48.1 mmol), the solution dehydrated with a solution of diethyl zinc in hexane (0.64 g; 0.9 mmol) was dropped over 18 minutes, stirred for 60 minutes after the dropping was completed, and added with methanol (1.15 g) for killing. From a gas chromatographic measurement at each polymerization step, no 3-[tris(trimethylsilyloxy)silyl]propyl methacrylate, 1-ethoxyethyl methacrylate or allyl methacrylate was detected.

Hydrochloric acid (2.00 g; 19.7 mmol) was added to the obtained polymerization liquid, stirred for a few hours at room temperature, concentrated, dropped in distilled water to precipitate a polymer. After filtration, the polymer was dried under reduced pressure at 40° C. The results of GPC measurement of the obtained polymer were Mn=6800, Mw/Mn=1.29, in terms of polystyrene standard.

Synthesis Example 2

Synthesis of AMA/TMSPMA•MA (50-24-26) Polymer

To a 200 mL-four-neck flask which was sufficiently subjected to nitrogen substitution, THF (158.9 g) and a solution of 3.80% lithium chloride in THF (5.21 g:4.7 mmol) were added, and n-BuLi solution (1.13 g; 2.7 mmol) was added at room temperature while stirring with a stirrer, and the mixture was stirred for 25 minutes. Then, the mixture was cooled down to −50° C., and stirred for 55 minutes. Next, n-BuLi solution (2.05 g; 4.9 mmol) was added, stirred for 10 minutes, and then added with t-butyl crotonate (0.50 g; 3.5 mmol) and stirred for 15 minutes. Then, a solution of diethyl zinc in hexane (3.39 g; 4.7 mmol) was added and then, THF (9.1 g) was added with allyl methacrylate (6.69 g; 53.0 mmol), and the solution dehydrated with a solution of diethyl zinc in hexane (0.48 g; 0.7 mmol) was dropped over 10 minutes, and the solution was stirred for 5 minutes after the dropping was completed. Next, THF (11.6 g) was added with 3-[tris(trimethylsilyloxy)silyl]propyl methacrylate (10.44 g; 24.7 mmol) and 1-ethoxyethyl methacrylate (4.37 g; 27.6 mmol), the solution dehydrated with a solution of diethyl zinc in hexane (0.77 g; 1.1 mmol) was dropped over 15 minutes, stirred for 60 minutes after the dropping was completed, and added with methanol (1.20 g) for killing. From a gas chromatographic measurement at each polymerization step, no allyl methacrylate, 3-[tris(trimethylsilyloxy)silyl]propyl methacrylate, or 1-ethoxyethyl methacrylate was detected.

Hydrochloric acid (2.38 g; 2.4 mmol) was added to the obtained polymerization liquid, stirred for a few hours at room temperature, concentrated, dropped in distilled water to precipitate a polymer. After filtration, the polymer was dried under reduced pressure at 40° C. The results of GPC measurement of the obtained polymer were Mn=6400, Mw/Mn=1.49, in terms of polystyrene standard.

Synthesis Example 3

Synthesis of AMA/TMSPMA•MA (30-21-49) Polymer

To a 200 mL-four-neck flask which was sufficiently subjected to nitrogen substitution, tetrahydrofuran THF (123.3 g) and a solution of 3.80% lithium chloride in THF (15.93 g 14.3 mmol) were added, and n-BuLi solution (0.57 g; 1.4 mmol) was added at room temperature while stirring with a stirrer, and the mixture was stirred for 20 minutes. Then, the mixture was cooled down to −40° C., added with n-BuLi solution (1.68 g; 4.0 mmol) and then added with t-butyl crotonate (0.60 g; 4.2 mmol) and stirred for 15 minutes. Then, a solution of diethyl zinc in hexane (1.52 g; 2.1 mmol) was added and stirred for 3 minutes. Then, THF (11.32 g) was added with 3-[tris(trimethylsilyloxy)silyl]propyl methacrylate (9.03 g; 21.4 mmol) and 1-ethoxyethylmethacrylate (7.97 g; 50.4 mmol), the solution dehydrated with a solution of diethyl zinc in hexane (0.62 g; 0.9 mmol) was dropped over 16 minutes, and the solution was stirred for 5 minutes after the dropping was completed. Then, THF (5.57 g) was added with allyl methacrylate (3.97 g; 31.5 mmol), the solution dehydrated with a solution of diethyl zinc in hexane (0.46 g; 0.6 mmol) was dropped over 4 minutes, stirred for 60 minutes after the dropping was completed, and added with methanol (0.97 g) for killing.

From a gas chromatographic measurement at each polymerization step, no 3-[tris(trimethylsilyloxy)silyl]propyl methacrylate, 1-ethoxyethyl methacrylate or allyl methacrylate was detected.

Hydrochloric acid (1.97 g; 18.91 mmol) was added to the obtained polymerization liquid, stirred for a few hours at room temperature, and added with triethylamine (0.69 g; 6.82 mmol). After filtrating triethylamine/hydrochloride salt, the resultant was concentrated, and dropped in distilled water to precipitate a polymer. After filtration, the polymer was dried under reduced pressure at 40° C. The results of GPC measurement of the obtained polymer were Mn=5900, Mw/Mn=1.23, in terms of polystyrene standard.

Synthesis Example 4

Synthesis of AMA/TMSPMA•MA (28-10-62) Polymer

To a 200 mL-four-neck flask which was sufficiently subjected to nitrogen substitution, THF (123.3 g) and a solution of 3.80% lithium chloride in THF (15.87 g:14.2 mmol) were added, and n-BuLi solution (0.84 g; 2.0 mmol) was added at room temperature while stirring with a stirrer, and the mixture was stirred for 15 minutes. Then, the mixture was cooled down to −40° C., added with n-BuLi solution (1.71 g; 4.1 mmol) and then added with t-butyl crotonate (0.58 g; 4.1 mmol) and stirred for 15 minutes. Then, a solution of diethyl zinc in hexane (1.91 g; 2.6 mmol) was added and stirred for 3 minutes. Then, THF (11.95 g) was added with 3-[tris(trimethylsilyloxy)silyl]propyl methacrylate (4.36 g; 10.3 mmol) and 1-ethoxyethyl methacrylate (10.18 g; 64.4 mmol), the solution dehydrated with a solution of diethyl zinc in hexane (0.84 g; 1.2 mmol) was dropped over 13 minutes, and stirred for 5 minutes after the dropping was completed. Then, THF (7.27 g) was added with allyl methacrylate (3.81 g; 30.2 mmol), the solution dehydrated with a solution of diethyl zinc in hexane (0.59 g; 0.8 mmol) was dropped over 7 minutes, stirred for 60 minutes after the dropping was completed, and added with methanol (1.05 g) for killing.

From a gas chromatographic measurement each polymerization step, no 3-[tris(trimethylsilyloxy) silyl] propyl methacrylate, 1-ethoxyethyl methacrylate or allyl methacrylate was detected.

Hydrochloric acid (2.45 g; 24.2 mmol) was added to the obtained polymerization liquid, stirred for a few hours at room temperature, and added with triethylamine (0.95 g; 9.4 mmol)

After filtrating triethylamine/hydrochloride salt, the resultant was concentrated, and dropped in distilled water to precipitate a polymer. After filtration, the polymer was dried under reduced pressure at 40° C. The results of GPC measurement of the obtained polymer were Mn=4700, Mw/Mn=1.33, in terms of polystyrene standard.

Synthesis Example 5

Synthesis of AMA/MA/TMSPMA(31-64-5) Polymer

To a 300 mL-five-neck flask which was sufficiently subjected to nitrogen substitution, THF (122.7 g) and a solution of 3.80% lithium chloride in THF (17.14 g:15.4 mmol) were added, and n-BuLi solution (0.83 g; 2.0 mmol) was added at room temperature while stirring with a stirrer, and the mixture was stirred for 20 minutes. Then, the mixture was cooled down to −40° C., added with n-BuLi solution (1.68 g; 4.0 mmol) and then added with t-butyl crotonate (0.61 g; 4.3 mmol) and stirred for 17 minutes. Then, a solution of diethyl zinc in hexane (1.73 g; 2.4 mmol) was added and stirred for 3 minutes. Then, THF (7.30 g) was added with allyl methacrylate (4.01 g; 31.8 mmol), the solution dehydrated with a solution of diethyl zinc in hexane (0.64 g; 0.9 mmol) was dropped over 6 minutes, and the solution was stirred for 6 minutes after the dropping was completed. Next, THF (11.73 g) was added with 1-ethoxyethyl methacrylate (10.26 g; 64.9 mmol), the solution dehydrated with a solution of diethyl zinc in hexane (0.79 g; 1.1 mmol) was dropped over 11 minutes, and the solution was stirred for 7 minutes after the dropping was completed. Next, THF (6.90 g) was added with 3-[tris(trimethylsilyloxy)silyl]propyl methacrylate (2.37 g; 5.6 mmol), the solution dehydrated with a solution of diethyl zinc in hexane (0.62 g; 0.9 mmol) was dropped over 3 minutes, stirred for 60 minutes after the dropping was completed, and added with methanol (1.16 g) for killing.

From a gas chromatographic measurement at each polymerization step, no allyl methacrylate, 1-ethoxyethyl methacrylate, or 3-[tris(trimethylsilyloxy) silyl]propyl methacrylate was detected.

Hydrochloric acid (2.51 g; 24.8 mmol) was added to the obtained polymerization liquid, stirred for a few hours at room temperature, and added with triethylamine (0.85 g; 8.4 mmol). After filtrating triethylamine/hydrochloride salt, the resultant was concentrated, and dropped in distilled water to precipitate a polymer. After filtration, the polymer was dried under reduced pressure at 40° C. The results of GPC measurement of the obtained polymer were Mn=10900, Mw/Mn=1.26, in terms of polystyrene standard.

Synthesis Example 6

Synthesis of AMA/TMSPMA/MA (50-28-22) Polymer

To a 300 mL-five-neck flask which was sufficiently subjected to nitrogen substitution, THF (151.7 g) and a solution of 3.80% lithium chloride in THF (4.07 g:3.7 mmol) were added, and n-BuLi solution (0.97 g; 2.3 mmol) was added at room temperature while stirring with a stirrer, and the mixture was stirred for 20 minutes. Then, the mixture was cooled down to −40° C., added with n-BuLi solution (1.90 g; 4.6 mmol) and then added with diphenylethylene (0.71 g; 3.9 mmol) and stirred for 10 minutes. A solution of diethyl zinc in hexane (0.62 g; 0.9 mmol) was added and stirred for 5 minutes. Then, THF (7.92 g) was added with allyl methacrylate (6.80 g; 53.9 mmol), the solution dehydrated with a solution of diethyl zinc in hexane (0.45 g; 0.6 mmol) was dropped over 5 minutes, and the solution was stirred for 6 minutes after the dropping was completed. Next, THF (10.10 g) was added with 3-[tris(trimethylsilyloxy)silyl]propyl methacrylate (12.98 g; 30.7 mmol), the solution dehydrated with a solution of diethyl zinc in hexane (0.49 g; 0.7 mmol) was dropped over 9 minutes, and stirred for 12 minutes after the dropping was completed. Next, THF (5.48 g) was added with 1-ethoxyethyl methacrylate (3.74 g; 23.6 mmol), the solution dehydrated with a solution of diethyl zinc in hexane (0.32 g; 0.4 mmol) was dropped over 3 minutes, stirred for 60 minutes after the dropping was completed, and added with methanol (1.02 g) for killing.

From a gas chromatographic measurement at each polymerization step, no allyl methacrylate, 3-[tris(trimethylsilyloxy)silyl]propyl methacrylate or 1-ethoxyethyl methacrylate was detected.

Hydrochloric acid (2.50 g; 24.7 Mmol) was added to the obtained polymerization liquid, stirred for a few hours at room temperature, added with triethylamine (1.31 g; 13.0 mmol). After filtrating triethylamine/hydrochloride salt, the resultant was concentrated, dropped in distilled water to precipitate a polymer. After stirring for 1 hour followed by filtration, the polymer was dried under reduced pressure at 40° C. The results of GPC measurement of the obtained polymer were Mn=7000, Mw/Mn=1.18, in terms of polystyrene standard.

Synthesis Example 7

Synthesis of AMA/MA/TMSPMA (63-31-6) Polymer

To a 300 mL-five-neck flask which was sufficiently subjected to nitrogen substitution, THF (151.6 g) and a solution of 3.80% lithium chloride in THF (17.08 g:15.3 mmol) were added, and n-BuLi solution (0.96 g; 2.3 mmol) was added at room temperature while stirring with a stirrer, and the mixture was stirred for 35 minutes. Then, the mixture was cooled down to −50° C., added with n-BuLi solution (1.64 g; 3.9 mmol) and then added with diphenylethylene (0.70 g; 3.9 mmol) and stirred for 17 minutes. Then, a solution of diethyl zinc in hexane (1.03 g; 1.4 mmol) was added and stirred for 2 minutes. Then, THF (11.14 g) was added with allyl methacrylate (13.38 g; 106.1 mmol), the solution dehydrated with a solution of diethyl zinc in hexane (0.63 g; 0.9 mmol) was dropped over 9 minutes, and stirred for 3 minutes after the dropping was completed. Next, THF (11.27 g) was added with 1-ethoxyethyl methacrylate (8.11 g; 51.3 mmol), the solution dehydrated with a solution of diethyl zinc in hexane (0.55 g; 0.8 mmol) was dropped over 8 minutes, and the solution was stirred for 10 minutes after the dropping was completed. Then, THF (6.14 g) was added with 3-[tris(trimethylsilyloxy)silyl]propyl methacrylate; TMSPMA (4.43 g; 10.5 mmol), the solution dehydrated with a solution of diethyl zinc in hexane (0.48 g; 0.7 mmol) was dropped over 6 minutes, stirred for 60 minutes after the dropping was completed, and added with methanol (0.98 g) for killing.

From a gas chromatographic measurement at each polymerization step, no allyl methacrylate, 3-[tris(trimethylsilyloxy)silyl]propyl methacrylate, or 1-ethoxyethyl methacrylate was detected.

Hydrochloric acid (2.51 g; 24.8 mmol) was added to the obtained polymerization liquid, stirred for a few hours at room temperature, and added with triethylamine (1.14 g; 11.3 mmol). After filtrating triethylamine/hydrochloride salt, the resultant was concentrated, dropped in distilled water to precipitate a polymer. After stirring for 1 hour followed by filtration, the polymer was dried under reduced pressure at 40° C. The results of GPC measurement of the obtained polymer were Mn=9600, Mw/Mn=1.23, in terms of polystyrene standard.

Synthesis Example 8

Synthesis of AMA/MA/PFOMA (63-31-6) Polymer

To a 300 mL-five-neck flask which was sufficiently subjected to nitrogen substitution, THF (148.4 g) and a solution of 3.80% lithium chloride in THF (14.97 g:13.4 mmol) were added, and n-BuLi solution (10 g; 2.6 mmol) was added at room temperature while stirring with a stirrer, and the mixture was stirred for 25 minutes. Then, the mixture was cooled down to −50° C., added with n-BuLi solution (1.77 g; 4.3 mmol), then added with diphenylethylene (0.81 g; 4.5 mmol), and stirred for 20 minutes. A solution of diethyl zinc in hexane (0.80 g; 1.1 mmol) was added and stirred for 3 minutes. Then, THF (10.63 g) was added with allyl methacrylate (12.67 g; 100.4 mmol), the solution dehydrated with a solution of diethyl zinc in hexane (0.50 g; 0.7 mmol) was dropped over 6 minutes, and the solution was stirred for 3 minutes after the dropping was completed. Next, THF (10.28 g) was added with 1-ethoxyethyl methacrylate (7.85 g; 49.6 mmol), the solution dehydrated with a solution of diethyl zinc in hexane (0.54 g; 0.7 mmol) was dropped over 10 minutes, and the solution was stirred for 10 minutes after the dropping was completed. Next, THF (5.19 g) was added with 1H,1H,2H,2H-perfluorooctyl methacrylate (PFOMA) (4.28 g; 9.9 mmol), the solution dehydrated with a solution of diethyl zinc in hexane (0.44 g; 0.6 mmol) was dropped over 5 minutes, and the solution was stirred for 30 minutes after the dropping was completed, and added with hydrochloric acid (2.44 g; 24.1 mmol) for killing.

From a gas chromatographic measurement at each polymerization step, no allyl methacrylate, methacrylic acid, or 1H,1H,2H,2H-perfluorooctyl methacrylate was detected.

Then, the mixture was reverted to room temperature, stirred for a few hours, and added with triethylamine (1.18 g; 11.7 mmol). After filtrating triethylamine/hydrochloride salt, the resultant was concentrated, dropped in distilled water to precipitate a polymer. After stirring for 1 hour followed by filtration, the polymer was dried under reduced pressure at 40° C. The results of GPC measurement of the obtained polymer were Mn=6700, Mw/Mn=1.17, in terms of polystyrene standard.

Synthesis Example 9

Synthesis of AMA/MA/PFDMA (63-31-6) Polymer

To a 300 mL-five-neck flask which was sufficiently subjected to nitrogen substitution, THF (154.7 g) and a solution of 3.80% lithium chloride in THF (13.70 g:12.3 mmol) were added, n-BuLi solution (1.12 g; 2.7 mmol) was added at room temperature while stirring with a stirrer, and the mixture was stirred for 15 minutes. Then, the mixture was cooled down to −50° C., added with n-BuLi solution (1.95 g; 4.7 mmol) and then added with diphenylethylene (0.72 g; 4.0 mmol) and stirred for 18 minutes. A solution of diethyl zinc in hexane (1.00 g; 1.4 mmol) was added and stirred for 3 minutes. Then, THF (11.78 g) was added with allyl methacrylate (13.32 g; 105.6 mmol), the solution dehydrated with a solution of diethyl zinc in hexane (0.47 g; 0.7 mmol) was dropped over 7 minutes, and the solution was stirred for 1 minute after the dropping was completed. Next, THF (8.70 g) was added with 1-ethoxyethyl methacrylate (8.12 g; 51.3 mmol), the solution dehydrated with a solution of diethyl zinc in hexane (0.48 g; 0.7 mmol) was dropped over 6 minutes, and stirred for 10 minutes after the dropping was completed. Next, THF (5.55 g) was added with 1H,1H,2H,2H-perfluorodecyl methacrylate (PFDMA) (5.40 g; 10.2 mmol), the solution dehydrated with a solution of diethyl zinc in hexane (0.47 g; 0.7 mmol) was dropped over 7 minutes, and the solution was stirred for 30 minutes after the dropping was completed, and added with hydrochloric acid (2.45 g; 24.2 mmol) for killing.

From a gas chromatographic measurement at each polymerization step, no allyl methacrylate, methacrylic acid, or 1H,1H,2H,2H-perfluorodecyl methacrylate was detected.

Then, the mixture was reverted to room temperature, stirred for a few hours, and added with triethylamine (1.03 g; 10.2 mmol). After filtrating triethylamine/hydrochloride salt, the resultant was concentrated, dropped in distilled water to precipitate a polymer. After stirring for 1 hour followed by filtration, the polymer was dried under reduced pressure at 40° C. The results of GPC measurement of the obtained polymer were Mn=6400, Mw/Mn=1.38, in terms of polystyrene standard.

Synthesis Example 10

Synthesis of AMA/TMSPMA/MA/EDMA (16-21-56-7) Star Polymer

To a 300 mL-five-neck flask which was sufficiently subjected to nitrogen substitution, THF (147.7 g) and a solution of 3.80% lithium chloride in THF (15.37 g:13.8 mmol) were added, and n-BuLi solution (1.60 g; 3.9 mmol) was added at room temperature while stirring with a stirrer, and the mixture was stirred for 20 minutes. Then, the mixture was cooled down to −50° C., added with n-BuLi solution (2.03 g; 4.9 mmol) and then added with diphenylethylene (0.78 g; 4.3 mmol) and stirred for 17 minutes. A solution of diethyl zinc in hexane (0.97 g; 1.3 mmol) was added and stirred for 3 minutes. Then, THF (5.00 g) was added with allyl methacrylate (1.87 g; 14.8 mmol), the solution dehydrated with a solution of diethyl zinc in hexane (0.28 g; 0.4 mmol) was dropped over 3 minutes, and stirred for 1 minute after the dropping was completed. Next, THF (8.93 g) was added with 3-[tris(trimethylsilyloxy)silyl]propyl methacrylate (8.64 g; 20.4 mmol), the solution dehydrated with a solution of diethyl zinc in hexane (0.49 g; 0.7 mmol) was dropped over 9 minutes, and stirred for 1 minute after the dropping was completed. Next, THF (8.09 g) was added with 1-ethoxyethyl methacrylate (8.60 g; 54.3 mmol), the solution dehydrated with a solution of diethyl zinc in hexane (0.48 g; 0.7 mmol) was dropped over 5 minutes, and stirred for 10 minutes after the dropping was completed. Then, ethylene glycol dimethacrylate (EDMA) (1.33 g; 6.7 mmol) was added slowly. Then, the mixture was stirred for 1 hour, and added with hydrochloric acid (2.93 g; 2.9 mmol) for killing.

From a gas chromatographic measurement at each polymerization step, no allyl methacrylate, 3-[tris(trimethylsilyloxy)silyl]propyl methacrylate, methacrylic acid, or diethylene glycol dimethacrylate was detected.

Then, the mixture was reverted to room temperature, stirred for a few hours, and added with triethylamine (1.49 g; 14.7 mmol). After filtrating triethylamine/hydrochloride salt, the resultant was concentrated, dropped in distilled water to precipitate a polymer. After stirring for 1 hour followed by filtration, the polymer was dried under reduced pressure at 40° C. The results of GPC measurement of the obtained polymer were Mn=19500, Mw/Mn=1.11, in terms of polystyrene standard.

Synthesis Example 11

Synthesis of ST/MA/PFDMA (41-51-8) Polymer

Mercaptothiazoline (0.323 g; 2.7 mmol) was placed in a 300 mL-five-neck flask which was sufficiently subjected to nitrogen substitution, and after nitrogen substitution, THF (105.0 g) and toluene (46.1 g) were added, and n-BuLi solution (3.87 g; 9.3 mmol) was added at −50° C. while stirring with a stirrer, and the mixture was stirred for 30 minutes. Then, a solution of diethyl zinc in hexane (0.97 g; 1.3 mmol) was added and stirred for 3 minutes. Then, THF (5.43 g) was added with styrene (ST) (5.52 g; 53.0 mmol) at −40° C., the solution dehydrated with a solution of dibutyl-magnesium in hexane (0.31 g; 0.4 mmol) was dropped over 11 minutes, and stirred for 3 minutes after the dropping was completed. Next, diphenylethylene (0.96 g; 5.3 mmol) was added and stirred for 16 minutes. Then, at −50° C., THF (6.12 g) was added with a solution of 3.80% lithium chloride in THF (5.80 g:5.2 mmol) and 1-ethoxyethyl methacrylate (10.43 g; 65.9 mmol), the solution dehydrated with a solution of diethyl zinc in hexane (0.61 g; 0.8=01) was dropped over 14 minutes, and stirred for 11 minutes after the dropping was completed. Then, THF (4.98 g) was added with 1H,1H,2H,2H-perfluorodecyl methacrylate (5.15 g; 9.7 mmol), the solution dehydrated with a solution of diethyl zinc in hexane (0.34 g; 0.5 mmol) was dropped over 7 minutes, and stirred for 30 minutes after the dropping was completed, and added with acetic acid (0.84 g; 14.0 mmol) for killing.

From a gas chromatographic measurement at each polymerization step, no styrene, 1-ethoxyethyl methacrylate, or 1H, 1H,2H,2H-perfluorodecyl methacrylate was detected. The results of GPC measurement of the obtained polymer were Mn=4900, Mw/Mn=1.26, in terms of polystyrene standard.

Then, the mixture was reverted to room temperature, concentrated, dropped in methanol to precipitate a polymer, stirred for 1 hour followed by filtration, and the polymer was dried under reduced pressure at 40° C.

The polymer was dissolved in THF (100 g), added with hydrochloric acid (1.06 g; 10.5 mmol), and stirred for a few hours. Then, triethylamine (1.06 g; 10.5 mmol) was added.

After filtrating triethylamine/hydrochloride salt, the resultant was concentrated, dropped in distilled water to precipitate a polymer. After stirring for 1 hour followed by filtration, and dried under reduced pressure at 40° C., the polymer was obtained.

Synthesis Example 12

Synthesis of MMA•HEMA/MA/TMSPMA (20-20-50-10) Polymer

To a 300 mL-five-neck flask which was sufficiently subjected to nitrogen substitution, THF (152.6 g) and a solution of 3.80% lithium chloride in THF (11.40 g:10.2 mmol) were added, and n-BuLi solution (1.13 g; 2.7 mmol) was added at room temperature while stirring with a stirrer, and the mixture was stirred for 20 minutes. Then, the mixture was cooled down to −50° C., added with n-BuLi solution (1.92 g; 4.6 mmol), then added with diphenylethylene (0.79 g; 4.4 mmol), stirred for 15 minutes, and added with a solution of diethyl zinc in hexane (0.91 g; 1.3 mmol). Then, THF (11.13 g) was added with methyl methacrylate (2.00 g; 20.0 mmol) and 2-(1-ethoxyethoxy)ethyl methacrylate (4.15 g; as 20.5 mmol: 90.9%) were added, the solution dehydrated with a solution of diethyl zinc in hexane (0.70 g; 1.0 mmol) was dropped over 7 minutes, and the solution was stirred for 2 minutes after the dropping was completed. Next, THF (11.17 g) was added with 1-ethoxyethylmethacrylate (7.88 g; 49.8 mmol), the solution dehydrated with a solution of diethyl zinc in hexane (0.73 g; 1.00 mmol) was dropped over 7 minutes, and stirred for 15 minutes after the dropping was completed. Then, THF (6.76 g) was added with 3-[tris(trimethylsilyloxy)silyl]propyl methacrylate (4.34 g; 10.3 mmol), the solution dehydrated with a solution of diethyl zinc in hexane (0.50 g; 0.7 mmol) was dropped over 5 minutes, and stirred for 20 minutes after the dropping was completed, added with methanol (0.93 g) for killing, and reverted to room temperature.

From a gas chromatographic measurement at each polymerization step, no methyl methacrylate, 2-(1-ethoxyethoxy)ethyl methacrylate, 1-ethoxyethyl methacrylate, or 3-[tris(trimethylsilyloxy) silyl]propyl methacrylate was detected. The results of GPC measurement of the obtained polymer were Mn=5100, Mw/Mn=1.11, in terms of polystyrene standard.

Then, concentrated hydrochloric acid (2.99 g; 29.5 mmol) was added, stirred for 12 hours, and then added with triethylamine (1.46 g; 14.4 mmol). After filtrating triethylamine/hydrochloride salt, the resultant was concentrated, dropped in distilled water to precipitate a polymer. After stirring for 1 hour followed by filtration, and dried under reduced pressure at 40° C., the polymer was obtained.

Synthesis Example 13

Synthesis of PFDMA/AMA/MA/EDMA (11-24-57-8) Star Polymer

To a 300 mL-five-neck flask which was sufficiently subjected to nitrogen substitution, THF (149.4 g) and a solution of 3.80% lithium chloride in THF (10.87 g:9.7 mmol) were added, and, n-BuLi solution (1.30 g; 3.1 mmol) was added at room temperature while stirring with a stirrer, and the mixture was stirred for 20 minutes. Then, the mixture was cooled down to −50° C., added with n-BuLi solution (1.88 g; 4.5 mmol), then added with t-butyl crotonate (0.71 g; 5.0 mmol), stirred for 5 minutes, added with a solution of diethyl zinc in hexane (0.42 g; 0.6 mmol) and stirred for 10 minutes. Then, THF (8.21 g) was added with 1H,1H,2H,2H-perfluorodecyl methacrylate (5.14 g; 9.7 mmol), the solution dehydrated with a solution of diethyl zinc in hexane (0.24 g; 0.3 mmol) was dropped over 4 minutes, and stirred for 3 minutes after the dropping was completed. Then, THF (8.15 g) was added with allyl methacrylate (2.59 g; 20.5 mmol), the solution dehydrated with a solution of diethyl zinc in hexane (0.54 g; 0.7 mmol) was dropped over 5 minutes, and stirred for 3 minutes after the dropping was completed. Next, THF (9.43 g) was added with 1-ethoxyethyl methacrylate (7.77 g; 49.1 mmol), the solution dehydrated with a solution of diethyl zinc in hexane (0.96 g; 1.3 mmol) was dropped over 6 minutes, and stirred for 10 minutes after the dropping was completed. Then, ethylene glycol dimethacrylate (1.44 g; 7.3 mmol) was added slowly, stirred for 20 minutes, and added with concentrated hydrochloric acid (2.60 g; 25.7 mmol) for killing.

From a gas chromatographic measurement at each polymerization step, no 1H,1H,2H,2H-perfluorodecyl methacrylate, allyl methacrylate, methacrylic acid, diethylene glycol dimethacrylate was detected. The results of GPC measurement of the obtained polymer were Mn=28700, Mw/Mn=1.12, in terms of polystyrene standard.

Then, the mixture was reverted to room temperature, stirred for a few hours, and added with triethylamine (1.22 g; 12.1 mmol). After filtrating triethylamine/hydrochloride salt, the resultant was concentrated, dropped in distilled water to precipitate a polymer. After stirring for 1 hour followed by filtration, and dried under reduced pressure at 40° C., the polymer was obtained.

Synthesis Example 14

Synthesis of MMA/VMA/MA/TFEMA Polymer

To a 200 mL-four-neck flask which was sufficiently subjected to nitrogen substitution, THF (151.1 g) and a solution of 4.32% lithium chloride in THF (10.32 g:10.5 mmol) were added, and n-BuLi solution (1.30 g; 3.1 mmol) was added at room temperature while stirring with a stirrer, and the mixture was stirred for 20 minutes. Then, the mixture was cooled down to −50° C., added with n-BuLi solution (4.03 g; 9.7 mmol) and then added with t-butyl crotonate (0.69 g; 4.9 mmol) and stirred for 15 minutes. A solution of diethyl zinc in hexane (2.75 g; 3.8 mmol) was added. Then, THF (7.66 g) was added with methyl methacrylate:MMA (3.05 g; 30.5 mmol) and vinyl methacrylate VMA (0.47 g; 4.5 mmol), the solution dehydrated with a solution of diethyl zinc in hexane (0.45 g; 0.6 mmol) was dropped over 4 minutes, and stirred for 3 minutes after the dropping was completed. Next, THF (11.18 g) was added with 1-ethoxyethyl methacrylate (7.69 g; 48.6 mmol), the solution dehydrated with a solution of diethyl zinc in hexane (0.91 g; 1.3 mmol) was dropped over 9 minutes, and stirred for 10 minutes after the dropping was completed. Then, THF (6.92 g) was added with 2,2,2-trifluoroethyl methacrylate:TFEMA (3.21 g; 19.1 mmol) the solution dehydrated with a solution of diethyl zinc in hexane (0.22 g; 0.3 mmol) was dropped over 3 minutes, stirred for 20 minutes after the dropping was completed, added with methanol (0.99 g) for killing, and reverted to room temperature.

From a gas chromatographic measurement at each polymerization step, no methyl methacrylate, vinyl methacrylate, 1-ethoxyethyl methacrylate, or 2,2,2-trifluoroethyl methacrylate was detected. The results of GPC measurement of the obtained polymer were Mn=4400, Mw/Mn=1.12, in terms of polystyrene standard.

Next, concentrated hydrochloric acid (4.48 g; 44.2 mmol) was added, stirred for a few hours, and added with triethylamine (2.01 g; 19.9 mmol). After filtrating triethylamine/ hydrochloride salt, the resultant was concentrated, dropped in distilled water to precipitate a polymer. After stirring for 1 hour followed by filtration, and dried under reduced pressure at 40° C., the polymer was obtained.

Synthesis Example 15

Introduction of Sulfonic Acid to the Polymer Side Chain of Synthesis Example 9 and Formation of Onium Salt The polymer synthesized in Synthesis Example 9 (4.53 g; 10 mmol in terms of methacrylic acid) was dissolved in THF (20.8 g), and added with a solution of 10% tetramethyl ammonium hydroxide in methanol (9.11 g; 10 mmol). When the solution became homogeneous, 1,3-propanesultone (1.35 g; 11.0 mmol) was added, and stirred at room temperature for 3 hours. The reaction solution was dropped into hexane while stirring to precipitate a polymer. After filtration, the polymer was dried under reduced pressure at 40° C.

From a gas chromatographic measurement of the solution after reaction, no 1,3-propane sultone was detected.

Comparative Synthesis Example 1

Synthesis of AMA•TMSPMA•MA(20-29-51) Polymer

To a 200 mL-four-neck flask which was sufficiently subjected to nitrogen substitution, THF (134.6 g) and a solution of 3.80% lithium chloride in THF (8.91 g:8.0 mmol) were added, and n-BuLi solution (0.58 g; 1.4 mmol) was added at room temperature while stirring with a stirrer, and the mixture was stirred for 35 minutes. Then, the mixture was cooled down to −40° C., added with n-BuLi solution (1.61 g; 3.9 mmol), then added with t-butyl crotonate (0.64 g; 4.5 mmol), and stirred for 15 minutes. Then, THF (12.01 g) was added with 3-[tris(trimethylsilyloxy)silyl]propylmethacrylate:TMSPMA (13.05 g; 30.9 mmol) and 1-ethoxyethyl methacrylate (8.41 g; 53.2 mmol) and allyl methacrylate:AMA (2.64 g; 20.9 mmol), the solution dehydrated with a solution of diethyl zinc in hexane (0.57 g; 0.8 mmol) was dropped over 19 minutes, stirred for 90 minutes after the dropping was completed, and added with methanol (0.91 g) for killing.

From a gas chromatographic measurement after polymerization, no allyl methacrylate, 3-[tris(trimethylsilyloxy)silyl] propyl methacrylate, 1-ethoxyethyl methacrylate was detected. The results of GPC measurement of the obtained polymer were Mn=8600, Mw/Mn=1.16, in terms of polystyrene standard.

Hydrochloric acid (2.09 g; 20.1 mmol) was added to the obtained polymerization solution, stirred for a few hours at room temperature, added with triethylamine (1.26 g; 12.5 mmol). After filtrating triethylamine/hydrochloride salt, the resultant was concentrated, dropped in distilled water to precipitate a polymer. After stirring for 1 hour followed by filtration, and dried under reduced pressure at 40° C., the polymer was obtained.

Comparative Synthesis Example 2

Synthesis of MMA/DMAEMA (75-25) Polymer

To a 200 mL-four-neck flask which was sufficiently subjected to nitrogen substitution, THF (87.8 g) and a solution of 3.80% lithium chloride in THF (10.20 g:9.1 mmol) were added, and n-BuLi solution (0.96 g; 2.3 mmol) were added at room temperature while stirring with a stirrer, and the mixture was stirred for 3 hours. Next, the mixture was cooled down to −50° C., added with n-BuLi solution (0.58 g; 1.4 mmol), then added with diphenylethylene (0.37 g; 2.1 mmol), and stirred for 15 minutes. Then, THF (6.72 g) was added with methyl methacrylate (6.78 g; 67.7 mmol), the solution dehydrated with a solution of diethyl zinc in hexane (0.41 g; 0.6 mmol) was dropped over 4 minutes, and stirred for 3 minutes after the dropping was completed. Then, THF (7.08 g) was added with 2-dimethyl amino ethyl methacrylate (DMAEMA) (5.72 g; 36.4 mmol), the solution dehydrated with a solution of diethyl zinc in hexane (0.20 g; 0.3 mmol) was dropped over 6 minutes, stirred for 30 minutes after the dropping was completed, and added with methanol (0.93 g) for killing.

Then, the mixture was reverted to room temperature, concentrated, dropped into pure water to precipitate the polymer, stirred for 1 hour and filtrated. Then, the precipitated polymer was immersed in hexane, filtered and dried under reduced pressure at 40° C. to obtain the polymer. From the NMR measurement, the copolymerization ratio (mol %) was methyl methacrylate/2-dimethylamino ethyl methacrylate=75.0/25.0.

From a gas chromatographic measurement at each polymerization step, no methyl methacrylate was detected, while some 2-dimethylamino ethyl methacrylate was detected. By measuring GPC in the polymerization step of methyl methacrylate, the results were Mn=25800, Mw/Mn=1.02 in terms of polystyrene standard. However, no clear peak of polymer was observed, due to a phenomenon probably caused by the adsorption of polymer in the polymerization process of 2-dimethylamino ethyl methacrylate, and the molecular weight could not be measured.

To the solution of the obtained polymer (4.58 g:10 mmol in terms of DMAEMA) dissolved in THF (100 g), a solution of methyl iodide (4.26 g; 30 mmol) dissolved in THF (10 g) was dropped while stirring, and the mixture was stirred for 2 hours after dropping. The gelled solution was concentrated, dried under reduced pressure at 40° C., and the polymer was obtained.

Example and Comparative Example A

The polymers synthesized in the Synthesis Examples were dissolved in THF, and an equivalent amount (100 mol %) of a solution of 5% tetramethylammonium hydroxide (TMAOH) in methanol was added with respect to the acid on the polymer side chain (Examples 1 to 19). However, for Examples 7 to 9, the amount of TMAOH was set as 50 to 100 mol % with respect to the anion source.

Further, as a Comparative Example, an equivalent amount (100 mol %) of a solution of 5% 2-methyl imidazole (2-MZ) in THF was added (Comparative Example 1). Further, the polymers synthesized in Comparative Synthesis Examples were dissolved in THF (Comparative Examples 2, 3).

In Example 16, 0.1 g of methacrylic acid and an equivalent amount of 5% TMAOH were added, and in Example 17 1.25 g of 80% methacryloyl choline chloride was added to form a composition with onium salt monomer.

TABLE 1

| composition | polymer | THF | 5% TMAOH | 5% 2-MZ |
|---|---|---|---|---|
| Example 1 | Synthesis Example 1 | 1 g | 10 g | 4.10 g | — |
| Example 2 | Synthesis Example 2 | 1 g | 10 g | 2.56 g | — |

TABLE 1-continued

| composition | polymer | THF | 5% TMAOH | 5% 2-MZ |
|---|---|---|---|---|
| Example 3 | Synthesis Example 3 | 1 g | 10 g | 5.38 g | — |
| Example 4 | Synthesis Example 4 | 1 g | 10 g | 8.66 g | — |
| Example 5 | Synthesis Example 5 | 1 g | 10 g | 10.02 g | — |
| Example 6 | Synthesis Example 6 | 1 g | 10 g | 1.95 g | — |
| Example 7 | Synthesis Example 7 | 0.5 g | 5 g | 2.11 g (100 mol %) | — |
| Example 8 | Synthesis Example 7 | 0.5 g | 5 g | 1.69 g (80 mol %) | — |
| Example 9 | Synthesis Example 7 | 0.5 g | 5 g | 1.05 g (50 mol %) | — |
| Example 10 | Synthesis Example 8 | 1 g | 10 g | 4.26 g | — |
| Example 11 | Synthesis Example 9 | 1 g | 10 g | 4.02 g | — |
| Example 12 | Synthesis Example 10 | 1 g | 10 g | 6.00 g | — |
| Example 13 | Synthesis Example 11 | 1 g | 10 g | 7.34 g | — |
| Example 14 | Synthesis Example 12 | 1 g | 10 g | 6.80 g | — |
| Example 15 | Synthesis Example 13 | 1 g | 10 g | 6.68 g | — |
| Example 16 | Synthesis Example 13 | 1 g | 10 g | 8.78 g | — |
| Example 17 | Synthesis Example 13 | 1 g | 10 g | 6.66 g | — |
| Example 18 | Synthesis Example 14 | 1 g | 10 g | 8.08 g | — |
| Example 19 | Synthesis Example 15 | 1 g | 10 g | quaternary ammonium salt (formed) | — |
| Comparative Example 1 | Synthesis Example 3 | 1 g | 10 g | — | 2.42 g (equivalent amount) |
| Comparative Example 2 | Comparative Synthesis Example 1 | 1 g | 10 g | 2.39 g | — |
| Comparative Example 3 | Comparative Synthesis Example 2 | 1 g | 10 g | — | — |

[Film Property Evaluation A]

The compositions compounded in [Example and Comparative Example A] were coated with a spinner to a glass epoxy substrate, and dried for 30 minutes in an oven of 100° C. The contact angle against water and tetradecane, and the surface resistance level of the obtained coating films were measured. The results are shown in the following table.

TABLE 2

| Evaluation | Composition Example | Water contact angle | Tetradecane contact angle | Surface resistance level ($\Omega/\square$) |
|---|---|---|---|---|
| Evaluation 1 | Example 1 | 105° | 36° | $2.7 \times 10^7$ |
| Evaluation 2 | Example 2 | 89° | 40° | $1.7 \times 10^8$ |
| Evaluation 3 | Example 3 | 51° | 39° | $1.9 \times 10^7$ |
| Evaluation 4 | Example 6 | 102° | 36° | $7.0 \times 10^{13}$ |
| Evaluation 5 | Example 7 | 92° | 26° | $6.6 \times 10^7$ |
| Evaluation 6 | Example 8 | 104° | 36° | $1.8 \times 10^8$ |
| Evaluation 7 | Example 9 | 78° | 36° | $4.2 \times 10^{11}$ |
| Evaluation 8 | Example 10 | 97° | 65° | $2.5 \times 10^7$ |
| Evaluation 9 | Example 11 | 100° | 59° | $3.2 \times 10^7$ |
| Evaluation 10 | Example 12 | 101° | 39° | $2.9 \times 10^7$ |
| Evaluation 11 | Example 13 | 58° | 45° | $1.3 \times 10^8$ |
| Evaluation 12 | Example 14 | 93° | 38° | $5.9 \times 10^8$ |
| Evaluation 13 | Example 15 | 90° | 68° | $2.8 \times 10^8$ |
| Evaluation 14 | Example 16 | 103° | 71° | $6.0 \times 10^6$ |
| Evaluation 15 | Example 17 | 75° | 48° | $4.6 \times 10^5$ |
| Evaluation 16 | Example 18 | 39° | 41° | $4.0 \times 10^7$ |
| Evaluation 17 | Example 19 | 57° | 43° | $1.9 \times 10^7$ |
| Evaluation 18 | Comparative Example 1 | 101° | 26° | $>10^{15}$ |
| Evaluation 19 | Comparative Example 2 | When the composition was left, it became gelatinous. | | |
| Evaluation 20 | Comparative Example 3 | The polymer was not soluble to THF. | | |

Example and Comparative Example B

As Examples, the polymers synthesized in the Synthesis Examples were dissolved in THF, and an equivalent amount of a solution of 5% tetramethyl ammonium hydroxide (TMAOH) in methanol was added with respect to the acid on the polymer side chain, trimethylolpropane triacrylate (VISCOTE #295) and benzophenone (PB), and 4-dimethylamino ethyl benzoate (DMABE) were added to remove the solvent (Examples 20 to 31).

As a comparative example, the compositions were prepared by using the polymers of the Comparative Synthesis Examples (Comparative Example 4). Further, the compositions were prepared without using polymers (Comparative Example 5).

In Example 30, 0.1 g of methacrylic acid was added to form a composition with onium salt monomer.

TABLE 3

| Composition | polymer | #295 | PB | DMABE | 5% TMAOH |
|---|---|---|---|---|---|
| Example 20 | Synthesis Example 1 | 0.3 g | 10 g | 0.30 g | 0.30 g | 1.22 g |
| Example 21 | Synthesis Example 1 | 1.0 g | 4 g | 0.18 g | 0.18 g | 4.10 g |
| Example 22 | Synthesis Example 2 | 0.3 g | 10 g | 0.30 g | 0.30 g | 0.78 g |
| Example 23 | Synthesis Example 2 | 1.0 g | 4 g | 0.15 g | 0.15 g | 2.60 g |
| Example 24 | Synthesis Example 7 | 0.3 g | 10 g | 0.30 g | 0.30 g | 1.27 g |
| Example 25 | Synthesis Example 8 | 1.0 g | 10 g | 0.30 g | 0.30 g | 4.26 g |
| Example 26 | Synthesis Example 9 | 0.5 g | 10 g | 0.30 g | 0.30 g | 2.01 g |
| Example 27 | Synthesis Example 9 | 1.0 g | 10 g | 0.30 g | 0.30 g | 4.03 g |
| Example 28 | Synthesis Example 10 | 1.0 g | 10 g | 0.30 g | 0.30 g | 6.02 g |
| Example 29 | Synthesis Example 13 | 1.0 g | 10 g | 0.30 g | 0.30 g | 6.68 g |
| Example 30 | Synthesis Example 13 | 1.0 g | 10 g | 0.30 g | 0.30 g | 8.76 g |
| Example 31 | Synthesis Example 15 | 1.0 g | 10 g | 0.30 g | 0.30 g | quaternary ammonium salt (formed) |
| Comparative Example 4 | Comparative Synthesis Example 2 | The polymer was not soluble to THF and VISCOTE #295. | | | | |
| Comparative Example 5 | — | — | 10 g | 0.30 g | 0.30 g | — |

[Film Property Evaluation B]

The compositions formulated in [Example and Comparative Example B] were coated with a bar coater on a glass epoxy substrate. The contact angle against water and tetradecane, and the surface resistance level of the obtained coating films which were subjected to UV irradiation 3 times with a 160 W high pressure mercury vapor lamp (distance; 10 cm, velocity; 10 m/minute) were measured. The results are shown in the following table.

TABLE 4

| Evaluation | Composition Example | Water contact angle | Tetradecane contact angle | Surface resistance level ($\Omega/\square$) |
|---|---|---|---|---|
| Evaluation 25 | Example 20 | 97° | 32° | $1.3 \times 10^{11}$ |
| Evaluation 26 | Example 21 | 101° | 33° | $7.5 \times 10^{10}$ |
| Evaluation 27 | Example 22 | 96° | 33° | $5.4 \times 10^{10}$ |
| Evaluation 28 | Example 23 | 99° | 38° | $3.9 \times 10^{10}$ |
| Evaluation 29 | Example 24 | 79° | 37° | $8.7 \times 10^{13}$ |
| Evaluation 30 | Example 25 | 62° | 41° | $6.5 \times 10^{11}$ |
| Evaluation 31 | Example 27 | 78° | 35° | $5.7 \times 10^{9}$ |
| Evaluation 32 | Example 28 | 52° | 41° | $1.2 \times 10^{9}$ |
| Evaluation 33 | Example 29 | 76° | 67° | $2.3 \times 10^{8}$ |
| Evaluation 34 | Example 30 | 98° | 74° | $1.7 \times 10^{8}$ |
| Evaluation 35 | Example 31 | 75° | 34° | $9.7 \times 10^{13}$ |
| Evaluation 36 | Comparative Example 4 | | Not measurable | |
| Evaluation 37 | Comparative Example 5 | 67° | 6° | $>10^{15}$ |

INDUSTRIAL APPLICABILITY

By using the polymer of the present invention, an antistatic effect or water- and oil-repellent effect can be obtained easily, and it can be easily applied to coating material, gum and adhesive, etc. using the polymer. Further, as the compound and a composition comprising the same are superior in conductive property, it is suitably used in optical products including thin display, electronic and electric equipment, semiconductor peripheral equipment, film, antistatic agent of molded products, water repellent and oil repellent, etc. It can provide a high antistatic function and high water and oil repellent property with a small added amount.

The invention claimed is:

1. A linear triblock polymer, consisting of:
   a) a block comprising an onium salt consisting of an anion on a polymer side chain and a counter cation, and
   b) a block comprising a living anionic polymerization-inactive vinyl group, hydroxyl group or carboxyl group, and
   c) a block comprising a fluorocarbon group or trialkylsilyl group on a polymer side chain;
   wherein:
   the block alignment is in the order of b)-a)-c), and
   the main chain polymer in each block is a (meth)acrylate polymer.

2. The linear triblock polymer according to claim 1, wherein the living anionic polymerization-inactive vinyl group is an allyl group.

3. The linear triblock polymer according to claim 1, wherein a number average molecular weight is 20000 or less.

4. The linear triblock polymer according to claim 3, wherein the molecular weight distribution is 1.8 or less.

5. The linear triblock polymer according to claim 1, wherein the cation component of onium salt is any one of quaternary ammonium, quaternary phosphonium, tertiary sulfonium, quaternary imidazolium, quaternary pyridinium, quaternary thiazolium, or quaternary oxazolium.

6. A composition comprising the linear triblock polymer according to claim 1, and at least one onium salt monomer represented by the following formulae (I) to (III):

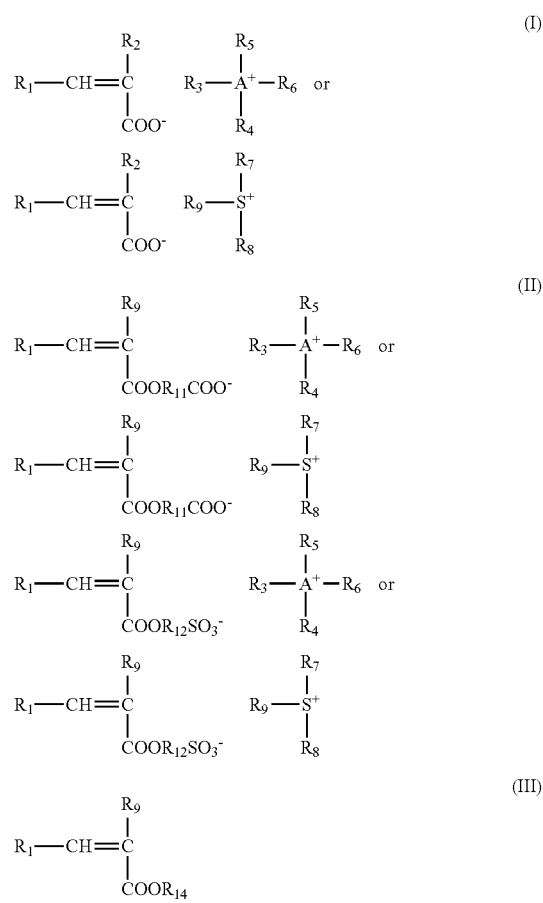

where:

$R_1$ represents a hydrogen atom or a hydrocarbon group with 1 to 4 carbons;

$R_2$ represents a hydrogen atom, a hydrocarbon group with 1 to 4 carbons, $CH_2COO^{31}$, or $CH_2COOR_{10}$;

$R_{10}$ represents a hydrogen atom, a hydrocarbon group with 1 to 4 carbons, and when it is $CH_2COO^-$, its counter cation is an ammonium, quaternary ammonium, phosphonium, quaternary phosphonium, or sulfonium;

$R_3$ to $R_8$ represent a hydrocarbon group with 1 to 4 carbons;

A represents a nitrogen atom or phosphorus atom;

$R_9$ represents a hydrogen atom, a hydrocarbon group with 1 to 4 carbons, or $CH_2COOR_{12a}$;

$Ru_{12a}$ represents a hydrocarbon group with 1 to 4 carbons;

$R_{11}$ and $R_{12}$ represent an alkylene group;

$R_{14}$ represents a group having the following formula structure:

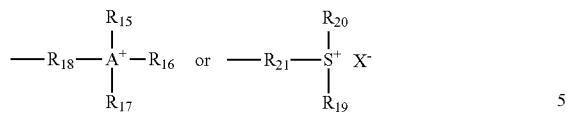

$R_{15}$ to $R_{21}$ represent a hydrocarbon group with 1 to 4 carbons;

X represents a halogen atom or $R_{22}$—$SO_3^-$; and $R_{22}$ represents an alkyl group, an alkoxy group that may be substituted with a halogen atom, or a phenyl group that may be substituted with an alkyl group, nitro group, or a halogen atom.

7. An antistatic agent comprising the linear triblock polymer according to claim 1.

8. A curable composition comprising the linear triblock polymer according to claim 1.

9. A water repellent and oil repellent comprising the linear triblock polymer according to claim 1.

* * * * *

UNITED STATES PATENT AND TRADEMARK OFFICE
CERTIFICATE OF CORRECTION

PATENT NO. : 8,710,151 B2
APPLICATION NO. : 12/809377
DATED : April 29, 2014
INVENTOR(S) : Eiji Takahashi Page 1 of 1

It is certified that error appears in the above-identified patent and that said Letters Patent is hereby corrected as shown below:

In the Claims

Column 34, line 49, "$CH_2COO^{31}$" should read "$CH_2COO^-$".

Column 35, lines 1-6, the left-hand formula should appear as follows:

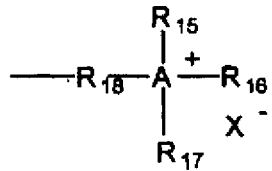

Signed and Sealed this
Nineteenth Day of August, 2014

Michelle K. Lee
*Deputy Director of the United States Patent and Trademark Office*